United States Patent
Kumano et al.

(10) Patent No.: US 8,141,095 B2
(45) Date of Patent: Mar. 20, 2012

(54) RECORDING MEDIUM STORING DATA ALLOCATION CONTROL PROGRAM, DATA ALLOCATION CONTROL DEVICE, DATA ALLOCATION CONTROL METHOD, AND MULTI-NODE STORAGE-SYSTEM

(75) Inventors: Tatsuo Kumano, Kawasaki (JP); Yasuo Noguchi, Kawasaki (JP); Kazutaka Ogihara, Kawasaki (JP); Masahisa Tamura, Kawasaki (JP); Yoshihiro Tsuchiya, Kawasaki (JP); Tetsutaro Maruyama, Kawasaki (JP); Takashi Watanabe, Kawasaki (JP); Riichiro Take, Kawasaki (JP); Kazuichi Oe, Kawasaki (JP); Minoru Kamosida, Kawasaki (JP); Shigeyuki Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 729 days.

(21) Appl. No.: 12/343,486

(22) Filed: Dec. 24, 2008

(65) Prior Publication Data

US 2009/0254702 A1 Oct. 8, 2009

(30) Foreign Application Priority Data

Dec. 26, 2007 (JP) .................................. 2007-333969

(51) Int. Cl.
*G06F 9/46* (2006.01)

(52) U.S. Cl. ............ 718/104; 712/28; 709/226; 713/300

(58) Field of Classification Search ........................ None
See application file for complete search history.

(56) References Cited

U.S. PATENT DOCUMENTS

| | | | | |
|---|---|---|---|---|
| 4,542,458 A | * | 9/1985 | Kitajima et al. | 718/104 |
| 6,085,216 A | * | 7/2000 | Huberman et al. | 718/104 |
| 6,470,344 B1 | * | 10/2002 | Kothuri et al. | 707/696 |
| 6,711,649 B1 | * | 3/2004 | Bachmat et al. | 711/114 |
| 7,155,722 B1 | * | 12/2006 | Hilla et al. | 718/105 |
| 7,631,023 B1 | * | 12/2009 | Kaiser et al. | 1/1 |
| 8,010,519 B2 | * | 8/2011 | Hsu et al. | 707/705 |
| 8,027,972 B2 | * | 9/2011 | Barsness et al. | 707/721 |
| 8,051,420 B2 | * | 11/2011 | Rolia et al. | 718/104 |

(Continued)

FOREIGN PATENT DOCUMENTS

JP 2000-293314 10/2000

(Continued)

OTHER PUBLICATIONS

Office Action mailed by Japan Patent Office on Jan. 5, 2010, in connection with JP patent application 2007-333969. Partial English-language translation provided.

*Primary Examiner* — Idriss N Alrobaye
(74) *Attorney, Agent, or Firm* — Fujitsu Patent Center

(57) ABSTRACT

A data allocation control program manages data allocation when data is distributively stored in a plurality of disk nodes that are shifted to a power saving mode unless access is performed for a certain time. The program produces a plurality of allocation pattern candidates each indicating the disk nodes in which the respective data are to be stored. The program calculates a no-access period expectation that represents an expected value of occurrence of a no-access period during which access is not performed to some of the disk nodes. The program selects as an allocation pattern for data reallocation, one of the plurality of produced allocation pattern candidates with the largest calculated no-access period expectation. The program instructs the disk nodes to reallocate the respective data in accordance with the selected allocation pattern.

14 Claims, 20 Drawing Sheets

U.S. PATENT DOCUMENTS

| | | |
|---|---|---|
| 2003/0046491 A1 | 3/2003 | Katsurashima |
| 2003/0188085 A1 | 10/2003 | Arakawa et al. |
| 2003/0193732 A1 | 10/2003 | Hakamata et al. |
| 2003/0193733 A1 | 10/2003 | Hakamata et al. |
| 2004/0054939 A1 | 3/2004 | Guha |
| 2005/0259345 A1 | 11/2005 | Hakamata et al. |
| 2006/0193073 A1 | 8/2006 | Hakamata et al. |
| 2007/0061512 A1 | 3/2007 | Taguchi |
| 2007/0106798 A1* | 5/2007 | Masumitsu et al. ............ 709/226 |
| 2008/0004096 A1* | 1/2008 | Graepel et al. ................... 463/9 |
| 2008/0005461 A1 | 1/2008 | Toda |
| 2008/0172670 A1* | 7/2008 | Corrigan et al. .............. 718/104 |
| 2008/0244295 A1* | 10/2008 | Mizuno ......................... 713/324 |
| 2008/0295107 A1* | 11/2008 | Muscarella ................... 718/104 |
| 2009/0227313 A1* | 9/2009 | Minka et al. ..................... 463/14 |
| 2010/0216477 A1* | 8/2010 | Ryan ............................. 455/449 |
| 2011/0247000 A1* | 10/2011 | Eidus et al. ................... 718/104 |

FOREIGN PATENT DOCUMENTS

| | | |
|---|---|---|
| JP | 2003-5920 | 1/2003 |
| JP | 2003-296039 | 10/2003 |
| JP | 2007-79754 | 3/2007 |
| WO | WO-2006/098036 | 9/2006 |

* cited by examiner

FIG. 16

DATA REALLOCATION CONTROL SECTION (530)

531 — NODE IDENTIFIER: SN-A

| SLICE NUMBER | NUMBER OF ACCESSES | | | |
|---|---|---|---|---|
| | 0-5 HOURS | 6-11 HOURS | 12-17 HOURS | 18-23 HOURS |
| 1 | 0 | 0 | 0 | 0 |
| 2 | 0 | 0 | 0 | 0 |
| 3 | 0 | 0 | 0 | 0 |
| 4 | 2 | 5 | 3 | 0 |
| 5 | 0 | 0 | 7 | 3 |

532 — NODE IDENTIFIER: SN-B

| SLICE NUMBER | NUMBER OF ACCESSES | | | |
|---|---|---|---|---|
| | 0-5 HOURS | 6-11 HOURS | 12-17 HOURS | 18-23 HOURS |
| 1 | 0 | 0 | 0 | 0 |
| 2 | 1 | 2 | 2 | 0 |
| 3 | 0 | 0 | 0 | 0 |
| 4 | 0 | 0 | 0 | 0 |
| 5 | 0 | 0 | 4 | 1 |

| NODE IDENTIFIER | SLICE NUMBER | PROBABILITY OF NO ACCESS | | | |
|---|---|---|---|---|---|
| | | 0-5 HOURS | 6-11 HOURS | 12-17 HOURS | 18-23 HOURS |
| SN-A | 4 | 0.3 | 0 | 0.1 | 1 |
| | 5 | 1 | 1 | 0 | 0.1 |
| SN-B | 2 | 0.5 | 0.3 | 0.3 | 1 |
| | 5 | 1 | 1 | 0.1 | 0.5 |
| ⋮ | ⋮ | ⋮ | ⋮ | ⋮ | ⋮ |

| NODE IDENTIFIER | PROBABILITY OF NO ACCESS | | | | EXPECTATION OF NO-ACCESS PERIOD |
|---|---|---|---|---|---|
| | 0-5 HOURS | 6-11 HOURS | 12-17 HOURS | 18-23 HOURS | |
| SN-A | 0.3 | 0 | 0 | 0.1 | 0.4 |
| SN-B | 0.5 | 0.3 | 0.03 | 0.5 | 1.33 |
| ⋮ | ⋮ | ⋮ | ⋮ | ⋮ | ⋮ |

| NODE IDENTIFIER | SLICE NUMBER | PROBABILITY OF NO ACCESS ||||
|---|---|---|---|---|---|
| | | 0-5 HOURS | 6-11 HOURS | 12-17 HOURS | 18-23 HOURS |
| SN-A | 4 | 0.3 | 0 | 0.1 | 1 |
| | 5 | 0.5 | 0.3 | 0.3 | 1 |
| SN-B | 2 | 1 | 1 | 0 | 0.1 |
| | 5 | 1 | 1 | 0.1 | 0.5 |
| ⋮ | ⋮ | ⋮ | ⋮ | ⋮ | ⋮ |

| NODE IDENTIFIER | PROBABILITY OF NO ACCESS |||| EXPECTATION OF NO-ACCESS PERIOD |
|---|---|---|---|---|---|
| | 0-5 HOURS | 6-11 HOURS | 12-17 HOURS | 18-23 HOURS | |
| SN-A | 0.15 | 0 | 0.03 | 1 | 1.18 |
| SN-B | 1 | 1 | 0 | 0.05 | 2.05 |
| ⋮ | ⋮ | ⋮ | ⋮ | ⋮ | ⋮ |

RECORDING MEDIUM STORING DATA ALLOCATION CONTROL PROGRAM, DATA ALLOCATION CONTROL DEVICE, DATA ALLOCATION CONTROL METHOD, AND MULTI-NODE STORAGE-SYSTEM

CROSS-REFERENCE TO RELATED APPLICATIONS

This application is based upon and claims the benefit of priority of the prior Japanese Patent Application No. 2007-333969, filed on Dec. 26, 2007, the entire contents of which are incorporated herein by reference.

BACKGROUND

1. Field

The embodiments discussed herein are related to a technique for controlling allocation of data that is allocated to a plurality of disk nodes in a distributed manner.

2. Background

Recently, computers have realized higher speeds and more advanced functions. Also, the scale of an entire computer system has increased with an increase in the variety of businesses using the computer systems. In a large-scaled computer system, data is allocated to a plurality of storage devices in a distributed manner. In such a distributed storage system, the storage device is managed in a corresponding relation to a logical volume. When accessing data in the storage device, a node performing the access designates the position of the data in a logical volume. Then, the node managing the storage device determines the data in the storage device, which corresponds to the designated data position in the logical volume, and makes access to the relevant data.

In the above-described distributed storage system, various performances of the entire computer system are affected by how data is allocated to the storage devices. For example, if accesses are concentrated on a particular storage device, this may cause, for example, a delay in the data access. To realize efficient data access, there is known a technique of moving a logical volume based on a resource amount and a load of each node so that appropriate data allocation is obtained. See Japanese Laid-open Patent Publication No. 2003-296039, for example. By using such a technique, data can be allocated to a plurality of storage devices with higher processing efficiency in the large-scaled distributed storage system.

A larger scale of the distributed storage system improves a processing capability of the system on the one side, but increases a consumption of power on the other side. A function of saving power in a computer can be realized by a technique of shifting an operation to a power saving mode when there is no access to any storage for a certain time. See Japanese Unexamined Patent Application Publication No. 2000-293314, for example. The power consumption can be reduced by turning off power supplied to a magnetic disk by utilizing the power saving mode.

However, the data reallocation techniques hitherto proposed for an improvement of performance are intended to improve the data processing performance without taking into consideration an improvement of environmental performance, such as a reduction of the power consumption. For that reason, the power consumption in the entire system cannot be reduced.

The technique disclosed in Japanese Laid-open Patent Publication No. 2000-293314 can reduce the power consumption in a single storage. In the distributed storage system, however, a series of data is distributively allocated in many cases for the purpose of increasing speed and reliability of data access. In that case, the data access is substantially evenly performed among a plurality of storage devices. Even when the technique disclosed in Japanese Laid-open Patent Publication No. 2000-293314 is directly applied to each of the storage devices in such a computer system, a time slot in which the supply of power can be turned off rarely occurs and an effective reduction of the power consumption cannot be expected.

A technique disclosed herein addresses the problems described above, and intends to realize data allocation suitable for reducing the power consumption.

SUMMARY

According to an aspect of the invention, a data allocation control program executed by a computer manages data allocation when data is distributively stored in a plurality of disk nodes which are shifted to a power saving mode unless access is performed for a certain time. An access statistical information collecting step collects access statistical information representing the number of accesses performed to respective data managed by the disk nodes within a given time slot, from an access statistical information storage unit which stores the access statistical information. A no-access probability calculating step refers to the access statistical information and sets, as a no-access-to-data probability for each data, a value that is increased for data with a smaller number of accesses within the given time slot. An allocation pattern candidate producing step produces a plurality of allocation pattern candidates each indicating the disk nodes in which the respective data are to be stored. An expectation calculating step calculates for each of the produced allocation pattern candidates, the no-access-to-data probabilities for the respective data allocated in each of the disk nodes when the respective data are allocated according to the allocation pattern candidate, to thereby calculate a no-access-to-node probability representing a probability that access is not performed to each disk node, and totaling the respective no-access-to-node probabilities for the disk nodes, thus obtains a no-access period expectation that represents an expected value of occurrence of a no-access period during which access is not performed to some of the disk nodes. An allocation pattern deciding step decides, as an allocation pattern for data reallocation, one of the plurality of produced allocation pattern candidates, which provides one of the calculated no-access period expectations. A data reallocation instructing step instructs the disk nodes to reallocate the respective data in accordance with the decided allocation pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 16 illustrates an example of collected access statistical information.

DESCRIPTION OF EMBODIMENTS

Figure 1:
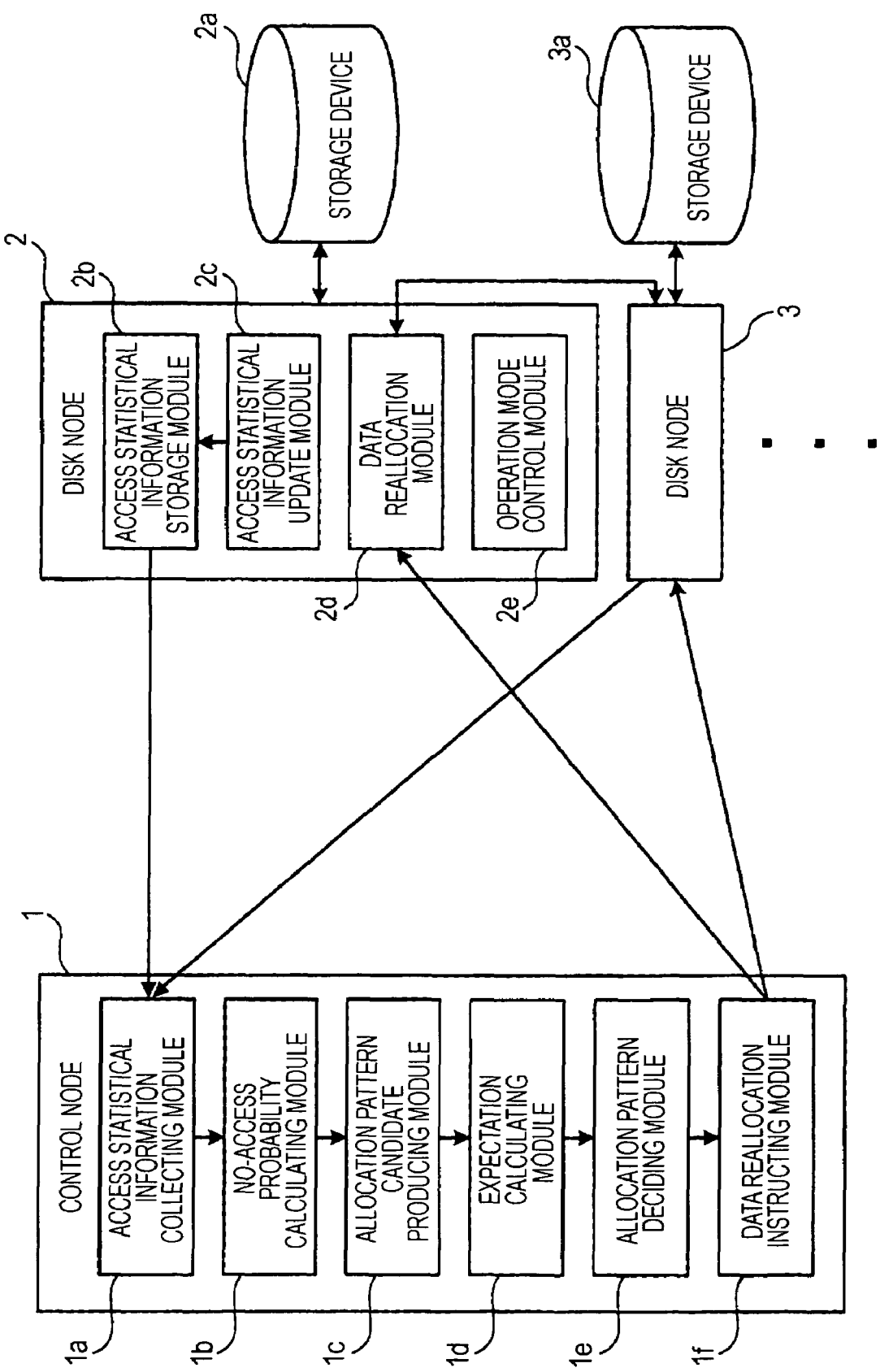
FIG. 1 illustrates a block diagram illustrating an outline of an embodiment.

FIG. 1 is a block diagram illustrating an outline of an embodiment. This embodiment intends to realize power saving in a multi-node storage system.

The multi-node storage system is one type of distributed storage systems including a plurality of storage devices. The distributed storage systems may be practiced in different forms, e.g., a system in which data is distributed to a plurality of storage devices connected to one node, and a system (multi-node storage system) in which data is distributed to respective storage devices in a plurality of nodes interconnected via a network. In the multi-node storage system, the system can be enhanced in units of disk node and the system configuration can be easily changed. In the multi-node storage system, however, because the system is operated using the plurality of nodes (computers) via the network, the power consumption is increased. Hence, power saving in the entire system is particularly required.

The multi-node storage system, shown in FIG. 1, includes a control node 1 and a plurality of disk nodes 2, 3, etc. Storage devices 2a, 3a, etc. are connected to the disk nodes 2, 3, etc., respectively. The disk node 2 includes an access statistical information storage module 2b, an access statistical information update module 2c, a data reallocation module 2d, and an operation mode control module 2e.

The access statistical information storage module 2b stores access statistical information representing the number of accesses that are performed within a given time slot on respective data stored in the storage device 2a. The access statistical information update module 2c updates the access statistical information whenever access is performed within the given time slot on the data stored in the storage device 2a.

Upon receiving a data reallocation instruction, the data reallocation module 2d transfers the data stored in the storage device 2a in accordance with the instruction.

When access to the data stored in the storage device 2a is not performed for a certain time, the operation mode control module 2e shifts the disk node 2 to a power saving mode in which at least a part of the functions is stopped. For example, the operation mode control module 2e stops the operation of a disk in the storage device 2a when access to the data stored in the storage device 2a is not performed for a certain time. Also, the operation mode control module 2e may stop data processing executed by the disk node 2 when access to the data stored in the storage device 2a is not performed for a certain time. A function of stopping the data processing of the disk node 2 can be provided, for example, by the suspend function of the disk node 2. The term "suspend function" means the function of storing the state immediately before turning off the source power such that, when the source power is next turned on, work can be resumed from the same state as immediately before turning off the source power.

Each of the other disk nodes 3, etc. also has the same function as that of the disk node 2.

In order to manage allocation of data when the data is distributively stored in the plurality of disk nodes 2, 3, etc., the control node 1 includes an access statistical information collecting module 1a, a no-access probability calculating module 1b, an allocation pattern candidate producing module 1c, an expectation calculating module 1d, an allocation pattern deciding module 1e, and a data reallocation instructing module 1f. The access statistical information collecting module 1a collects the access statistical information from the access statistical information storage module 2b in the disk node 2. Likewise, the access statistical information collecting module 1a further collects the access statistical information from each of the other disk nodes 3, etc.

The no-access probability calculating module 1b refers to the collected access statistical information and sets, as a no-access-to-data probability for each data, a value that is increased for data with a smaller number of accesses within a given time slot. For example, the no-access probability calculating module 1b sets, as the no-access-to-data probability, a value that is a power of two or more (e.g., 2) with an exponent given by a value resulting from multiplying the number of accesses within the given time slot by a negative number.

The allocation pattern candidate producing module 1c produces a plurality of allocation pattern candidates each indicating the disk nodes in which respective data are to be stored.

The expectation calculating module 1d calculates, for each of the allocation pattern candidates produced by the allocation pattern candidate producing module 1c, the no-access-to-data probabilities for the respective data allocated in each of the disk nodes 2, 3, etc. when the respective data are allocated according to the allocation pattern candidate. Then, the expectation calculating module 1d calculates a no-access-to-node probability representing the probability that access is not performed to each disk node. Furthermore, the expectation calculating module 1d tallies the respective no-access-to-node probabilities for the disk nodes 2, 3, etc., thus obtaining a no-access period expectation that represents an expected value of occurrence of a no-access period (time) during which access is not performed to some of the disk nodes. For example, the expectation calculating module 1d obtains the probability that access is not performed to each of the disk nodes 2, 3, etc., by multiplying together the no-access-to-data probabilities for the respective data allocated in each of the disk nodes 2, 3, etc. when the respective data are allocated according to each of the allocation pattern candidates. Furthermore, the expectation calculating module 1d provides a value depending on the calculated no-access-to-node probability as the no-access period expectation for the disk node.

The allocation pattern deciding module 1e selects, as an allocation pattern for the data reallocation, an allocation pattern with the largest no-access time period expectation calculated by the expectation calculation module 1d among the plurality of allocation patterns produced by the allocation pattern candidate producing module 1c.

The data reallocation instructing module 1f instructs the disk nodes 2, 3, etc. to reallocate the respective data in accordance with the allocation pattern selected by the allocation pattern deciding module 1e.

According to the multi-node storage system thus constructed, whenever access is performed to the data stored in the storage device 2a, which is connected to the disk node 2, the access statistical information in the access statistical information storage module 2b is updated by the access statistical information update module 2c. Then, the access statistical information is collected from the disk nodes 2, 3, etc. by the access statistical information collecting module 1a of the control node 1. The no-access probability calculating module 1b sets, as the no-access-to-data probability for each data, the value that is increased for the data with a smaller number of accesses within the given time slot. Furthermore, the allocation pattern candidate producing module 1c produces the plurality of allocation pattern candidates each indicating the disk nodes in which respective data are to be stored.

Moreover, the expectation calculating module 1d calculates, for each of the produced allocation pattern candidates, the no-access-to-node probability representing the probability that access is not performed to each disk node, and further calculates the no-access period expectation that represents the expected value of occurrence of the no-access period (time) during which access is not performed to some of the disk nodes. The allocation pattern deciding module 1e selects, as the allocation pattern for data reallocation, one of the plurality of allocation pattern candidates with the largest calculated no-access period expectations. The data reallocation is instructed to the disk nodes 2, 3, etc. in accordance with the selected allocation pattern. In the disk node 2, the data reallocation module 2d transfers the data, which is stored in the storage device 2a, in accordance with the instructed data reallocation. The data reallocation is executed by cooperation of the plurality of disk nodes 2, 3, etc.

When access is not performed to the data stored in the storage device 2a for a certain time, the operation mode control module 2e in each of the disk nodes 2, 3, etc. shift the corresponding disk node to the power saving mode in which at least a part of the functions is stopped.

Thus, the data can be reallocated such that the time during which access is not performed to some of the disk nodes 2, 3, etc. is prolonged. As a result, the time during which some of the disk nodes 2, 3, etc. is shifted to the power saving mode is prolonged, and power consumption in the entire system can be reduced.

In the multi-node storage system, data can be arranged with dual redundancy so as to have primary and secondary attributes. The term "primary data" means data that preferentially becomes an access target. The term "secondary data" means data that is used when the primary data cannot be accessed. When data is arranged with dual redundancy, the possibility of access to a disk node, which is shifted to the power saving mode, can be further reduced by arranging, as the secondary data, all data managed by that disk node. Stated another way, the power saving mode can be maintained for a longer time, and the effect of cutting the power consumption can be increased. In view of the above-mentioned point, the embodiment of the present invention will be described in more detail, for example, in connection with a multi-node storage system which handles data arranged with dual redundancy.

Figure 2:
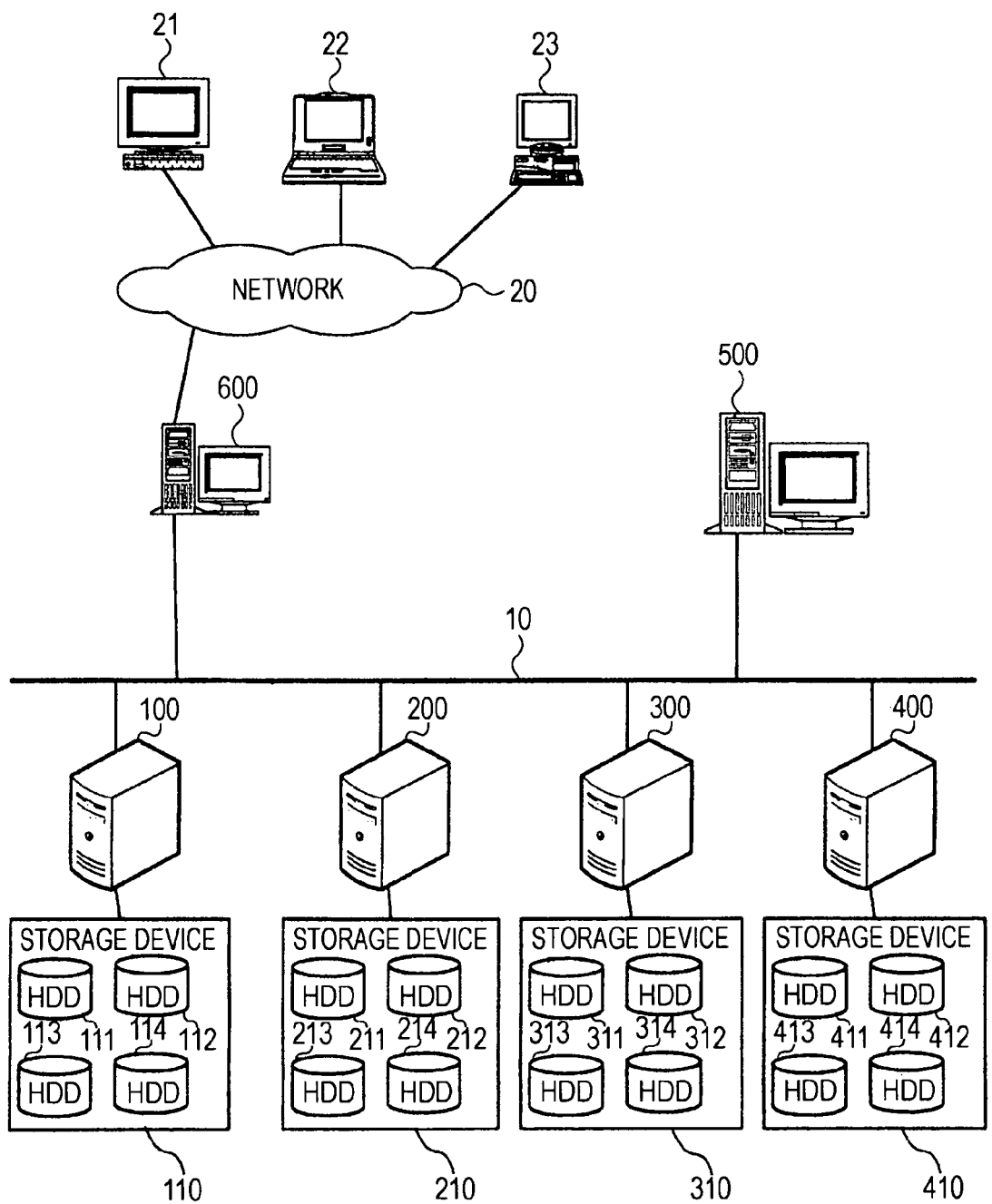
FIG. 2 illustrates a configuration of a multi-node storage system according to the embodiment.

FIG. 2 illustrates a configuration of a multi-node storage system according to the embodiment. In the multi-node storage system according to the embodiment, a plurality of disk nodes 100, 200, 300, and 400, a control node 500, and an access node 600 are interconnected via a network 10. Storage devices 110, 210, 310, and 410 are connected respectively to the disk nodes 100, 200, 300, and 400.

The storage device 110 incorporates a plurality of hard disk drives (HDDs) 111, 112, 113, and 114. The storage device 210 incorporates a plurality of HDDs 211, 212, 213, and 214. The storage device 310 incorporates a plurality of HDDs 311, 312, 313, and 314. The storage device 410 incorporates a plurality of HDDs 411, 412, 413, and 414. Each of the storage devices 110, 210, 310, and 410 is a RAID (Redundant Arrays of Inexpensive Disks) system using built-in HDDs. In this embodiment, each of the storage devices 110, 210, 310, and 410 provides a disk management service of RAID5.

Each of the disk nodes 100, 200, 300, and 400 may be a computer having an architecture called IA (Intel Architecture), for example. The disk nodes 100, 200, 300, and 400 manage respective data stored in the interconnected storage devices 110, 210, 310, and 410, and provide the data under management to terminal devices 21 to 23 via the network 10. Furthermore, the disk nodes 100, 200, 300, and 400 manage data with redundancy. Stated another way, similar data is managed in at least two disk nodes.

The control node 500 manages the disk nodes 100, 200, 300, and 400. For example, the control node 500 decides data allocation suitable for power saving at a given timing and instructs the disk nodes 100, 200, 300, and 400 to execute data reallocation.

The plurality of terminal devices 21 to 23 are connected to the access node 600 via a network 20. The access node 600 recognizes locations where the respective data managed by the disk nodes 100, 200, 300, and 400 are stored, and performs data access to the disk nodes 100, 200, 300, and 400 in response to requests from the terminal devices 21 to 23.

Figure 3:
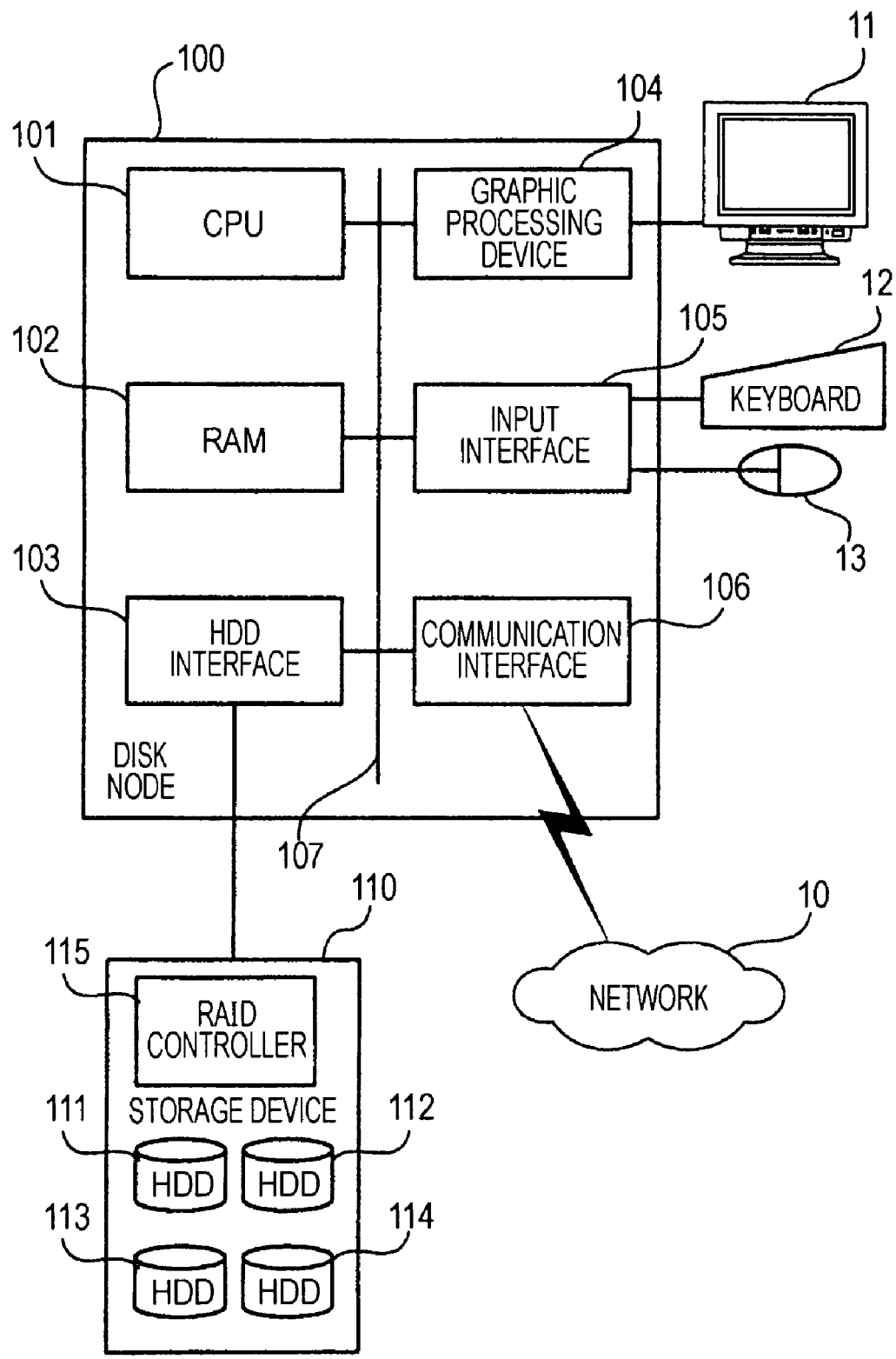
FIG. 3 illustrates a hardware configuration of a disk node used in the embodiment.

FIG. 3 illustrates a hardware configuration of the disk node used in the embodiment. The disk node 100 is entirely controlled by a CPU (Central Processing Unit) 101. A RAM (Random Access Memory) 102, an HDD interface 103, a graphic processing device 104, an input interface 105, and a communication interface 106 are connected to the CPU 101 via a bus 107.

The RAM 102 temporarily stores at least a part of the programs for an OS (Operating System) and application programs, which are to be executed by the CPU 101. The RAM 102 also stores various data necessary for the processing executed by the CPU 101.

The storage device 110 is connected to the HDD interface 103. The HDD interface 103 communicates with a RAID controller 115 built in the storage device 110 to input and output data with respect to the storage device 110. The RAID controller 115 in the storage device 110 has the functions of RAID0-to-5 and manages the plurality of HDD 111 to 114 together as one hard disk (drive).

A monitor 11 is connected to the graphic processing device 104. The graphic processing device 104 displays an image on a screen of the monitor 11 in accordance with an instruction from the CPU 101. A keyboard 12 and a mouse 13 are connected to the input interface 105. The input interface 105 transmits signals sent from the keyboard 12 and the mouse 13 to the CPU 101 via the bus 107.

The communication interface 106 is connected to the network 10. The communication interface 106 transmits and receives data to and from other computers via the network 10. Furthermore, the communication interface 106 has the so-called WakeOnLAN function. The WakeOnLAN function enables the communication interface 106 to accept a signal indicating a system startup request via the network 10 even in the state where the operation of the CPU 101 is stopped. Upon receiving such a signal, the communication interface 106 can start up the system with the WakeOnLAN function.

Figure 4:
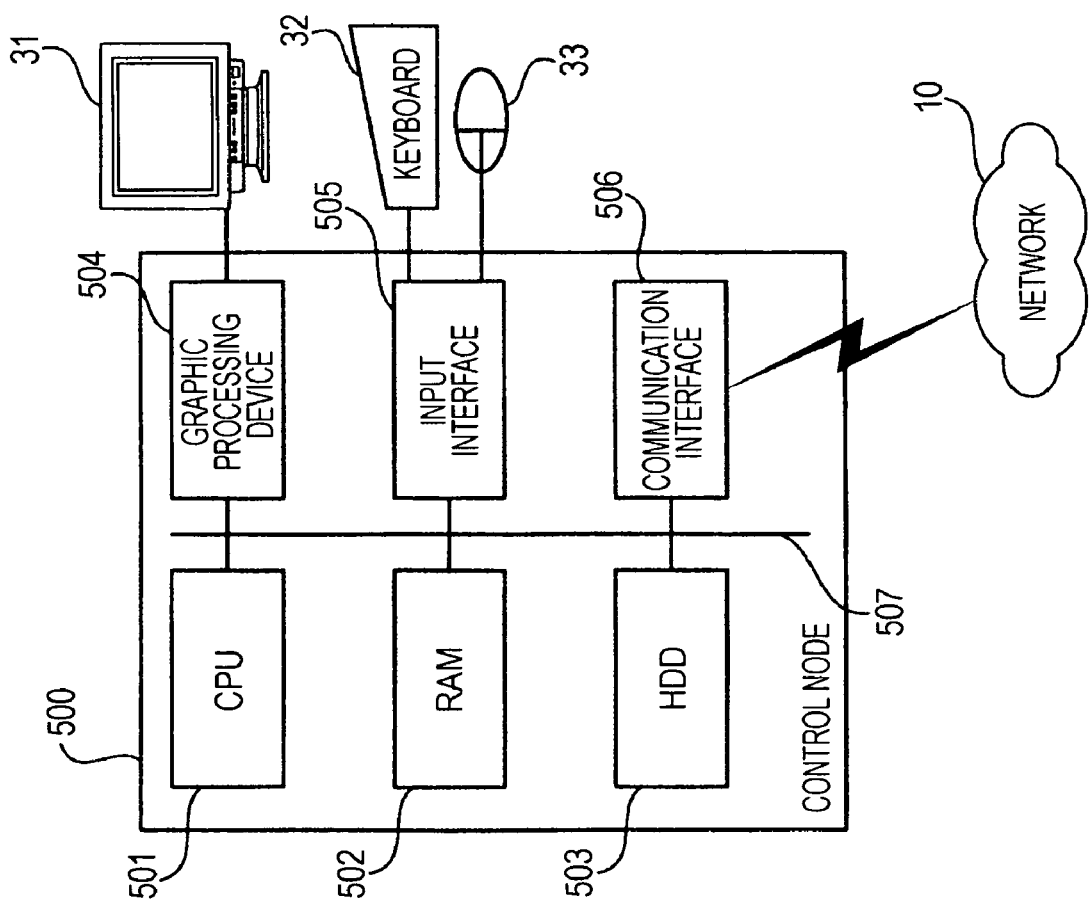
FIG. 4 illustrates a hardware configuration of a control node used in the embodiment.

FIG. 4 illustrates a hardware configuration of the control node used in the embodiment. The control node 500 is controlled by a CPU 501. A RAM 502, an HDD 503, a graphic processing device 504, an input interface 505, and a communication interface 506 are connected to the CPU 501 via a bus 507.

The RAM 502 temporarily stores at least a part of the OS programs and application programs, which are to be executed by the CPU 501. The RAM 502 also stores various data necessary for the processing executed by the CPU 501. The HDD 503 stores the OS programs and the application programs.

A monitor 31 is connected to the graphic processing device 504. The graphic processing device 504 displays an image on a screen of the monitor 31 in accordance with an instruction from the CPU 501. A keyboard 32 and a mouse 33 are connected to the input interface 505. The input interface 505 transmits signals sent from the keyboard 32 and the mouse 33 to the CPU 501 via the bus 507.

The communication interface 506 is connected to the network 10. The communication interface 506 transmits and receives data to and from other computers via the network 10.

The processing functions of this embodiment can be realized with the hardware configuration described above. While FIG. 3 illustrates the hardware configurations of only the disk node 100 and the storage device 110, each of the other disk nodes 200, 300, and 400, and the other storage devices 210, 310, and 410 can also have a similar hardware configuration. Furthermore, each of the access node 600 and the terminal devices 21 to 23 can have a hardware configuration similar to that of the control node 500 shown in FIG. 4.

The plurality of disk nodes 100, 200, 300, and 400 are connected to the network 10, as shown in FIG. 2, such that each of the disk nodes 100, 200, 300, and 400 can communicate with other disk nodes. The multi-node storage system thus constructed functions as a virtual volume (hereinafter referred to as a "logical volume") for the terminal devices 21 to 23.

Figure 5:
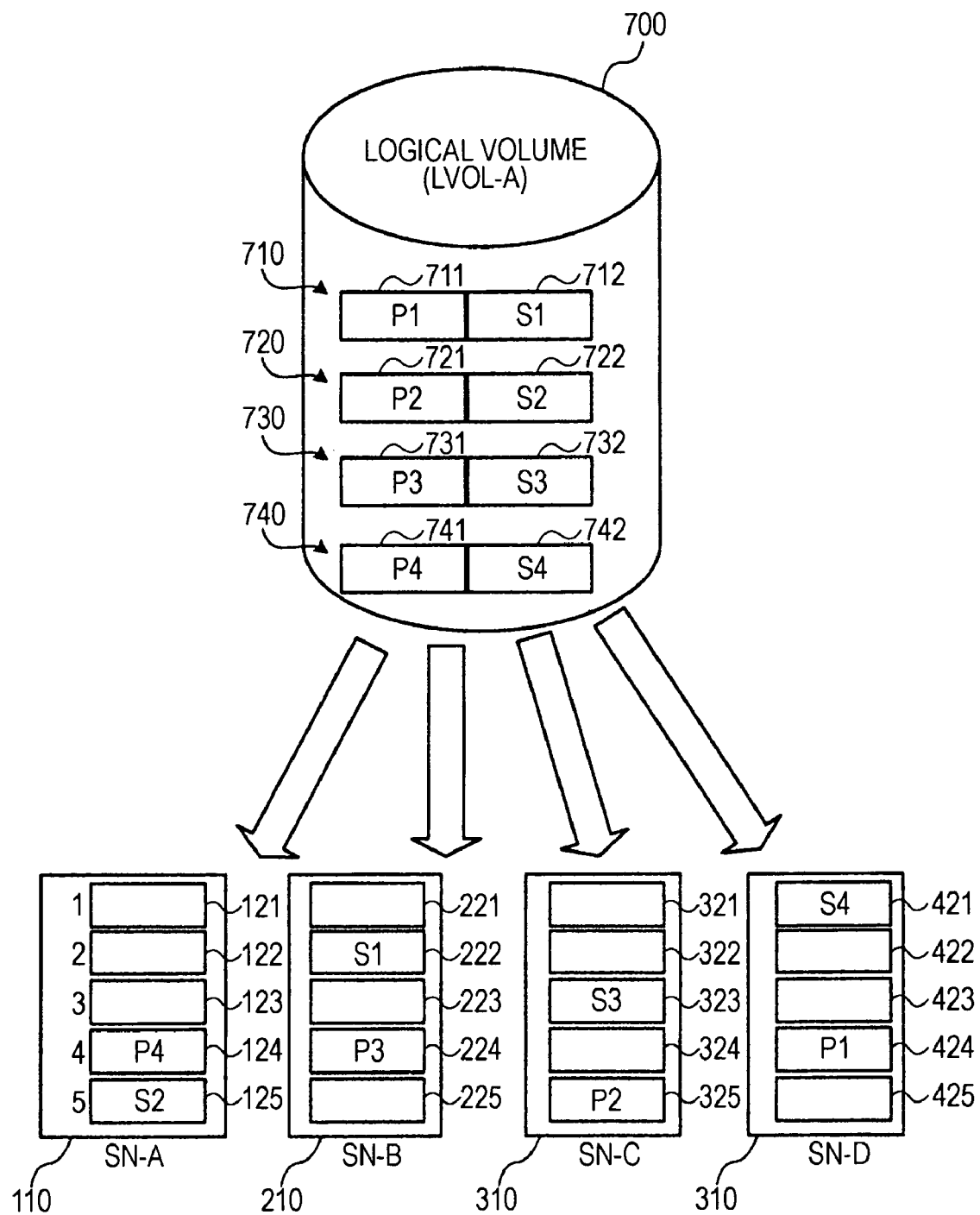
FIG. 5 illustrates a data structure of a logical volume.

FIG. 5 illustrates a data structure of the logical volume. A logical volume 700 is assigned with an identifier (logical volume identifier) "LVOL-A". The four disk nodes 100, 200, 300, and 400 interconnected via the network are assigned with node identifiers "SN-A", "SN-B", "SN-C" and "SN-D", respectively, for identification of the individual disk nodes.

A logical disk of RAID5 is constituted in each of the storage devices 110, 210, 310, and 410 which are associated respectively with the disk nodes 100, 200, 300, and 400. The logical disk is divided into five slices and is managed within each disk node.

In an example of FIG. 5, a memory area in the storage device 110 is divided into five slices 121 to 125. A memory area in the storage device 210 is divided into five slices 221 to 225. A memory area in the storage device 310 is divided into five slices 321 to 325. A memory area in the storage device 410 is divided into five slices 421 to 425.

The logical volume 700 is constituted in units of segments 710, 720, 730, and 740. Each of the segments 710, 720, 730, and 740 has the same memory capacity as the slice that is a unit for management of the storage devices 110, 210, 310, and 410. For example, if the memory capacity of the slice is 1 gigabyte, the memory capacity of the segment is also 1 gigabyte. The memory capacity of the logical volume 700 is an integral multiple of the memory capacity of one segment. For example, if the memory capacity of one segment is 1 gigabyte, the memory capacity of the logical volume 700 is 4 gigabytes.

The segments 710, 720, 730, and 740 are constituted by respective sets of primary slices 711, 721, 731, and 741 and secondary slices 712, 722, 732, and 742. The slices belonging to the same segment belong to different disk nodes. Each slice is managed based on slice management information. The slice management information includes the logical volume identifier, segment information, information indicating slices constituting the same segment, a flag indicating a primary slice or a secondary slice, etc.

In the example of FIG. 5, an identifier for identifying the attribute of each slice is denoted by a combination of an alphabet of "P" or "S" and a numeral. "P" represents the primary slice. "S" represents the secondary slice. A numeral following the alphabet represents to which one of the segments the slice belongs. For example, the primary slice of the first segment 710 is indicated by "P1" and the secondary slice of the first segment 710 is indicated by "S1".

Each primary slice and each secondary slice of the logical volume 700 having the above-described structure are each in a corresponding relation to one of the slices in the storage devices 110, 210, 310, and 410. For example, the primary slice 711 (P1) of the segment 710 corresponds to the slice 424 in the storage devices 410, and the secondary slice 712 (S1) of the segment 710 corresponds to the slice 222 in the storage devices 210.

Each of the storage devices 110, 210, 310, and 410 stores data of the primary slice or the secondary slice that is in a corresponding relation to the slice in the relevant storage device.

Figure 6:
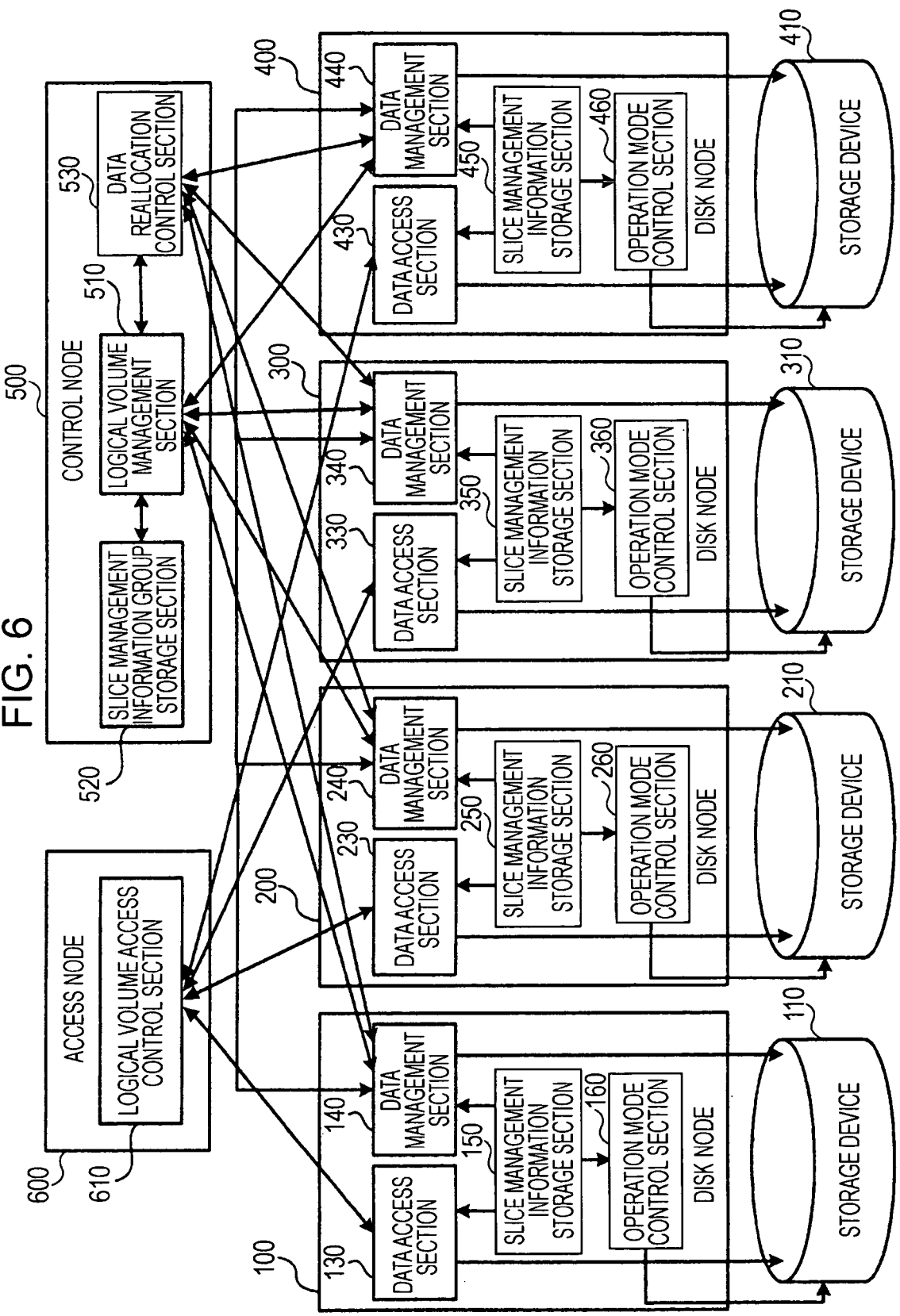
FIG. 6 illustrates a block diagram illustrating functions of various devices in the multi-node storage system.

FIG. 6 is a block diagram illustrating functions of various devices in the multi-node storage system. The access node 600 has a logical volume access control section 610. In response to an access request from the terminal devices 21 to 23, which designates data in the logical volume 700, the logical volume access control section 610 executes data access to the disk node which manages the corresponding data. More specifically, the logical volume access control section 610 stores the corresponding relations between the primary slice or the secondary slice of each segment in the logical volume 700 and the slices in the storage devices 110, 210, 310, and 410. Upon receiving the access request for data in some segment from the terminal devices 21 to 23, the logical volume access control section 610 executes data access to the storage device which includes the slice corresponding to the primary slice of the relevant segment.

The control node 500 has a logical volume management section 510, a slice management information group storage section 520, and a data reallocation control section 530.

The logical volume management section 510 manages the slices in the storage devices 110, 210, 310, and 410 associated respectively with the disk nodes 100, 200, 300, and 400. For example, the logical volume management section 510 transmits a slice management information acquisition request to the disk nodes 100, 200, 300, and 400 at startup of the system.

Then, the logical volume management section 510 stores, in the slice management information group storage section 520, slice management information sent in response to the slice management information acquisition request.

Furthermore, upon receiving a data reallocation instruction from the data reallocation control section 530, the logical volume management section 510 executes data reallocation in response to the instruction. More specifically, a change of allocation of the slices to the segments is instructed by the data reallocation instruction. The logical volume management section 510 having received the change instruction instructs each of the disk nodes 100, 200, 300, and 400 to update the slice management information and to copy the data in the slices. As a result, in the disk nodes 100, 200, 300, and 400, the data is copied from the slice at each reallocation source to each reallocation destination according to the data reallocation instruction. If another segment is assigned to the slice at the reallocation destination, the copying is executed after temporarily saving the data in the slice at the reallocation destination to a free area. When the copying in the disk nodes 100, 200, 300, and 400 is completed, the logical volume management section 510 updates the slice management information in the slice management information group storage section 520 and notifies the contents of the update to the access node 600.

In addition, upon receiving a slice attribute change request from any disk node, the logical volume management section 510 changes the slice indicated by the attribute change request from the primary slice to the secondary slice. More specifically, the logical volume management section 510 having received the attribute change request updates the slice management information in the slice management information group storage section 520 so as to exchange the primary slice and the secondary slice of the segment to which the slice indicated by the attribute change request is assigned. Then, the logical volume management section 510 transmits an attribute change request to two disk nodes each having the slice as an update target. In response to the attribute change request, those two disk nodes update the slice management information therein. Furthermore, the logical volume management section 510 notifies the contents of the slice management information in the slice management information group storage section 520 to the access node 600.

The slice management information group storage section 520 has a storage function of storing the slice management information collected from the disk nodes 100, 200, 300, and 400. For example, part of a memory area of the RAM in the control node 500 is used as the slice management information group storage section 520.

The data reallocation control section 530 periodically executes data reallocation to the storage devices 110, 210, 310, and 410 (reassignment of the slices to the segments). More specifically, at a given timing, the data reallocation control section 530 collects access statistical information from the disk nodes 100, 200, 300, and 400. The access statistical information represents the number of accesses per time slot, which are performed to each slice managed by the disk nodes 100, 200, 300, and 400.

Appropriate data allocation can be decided based on the collected data access statistical information. The data reallocation is executed in two cases, one for increasing the processing efficiency, and the other for reducing the power consumption (improving the environmental performance). In the data reallocation for increasing the processing efficiency, the data reallocation control section 530 reallocates the data such that accesses are substantially evenly performed among the disk nodes 100, 200, 300, and 400. Stated another way, the data reallocation control section 530 reallocates the data such that the number of accesses to each of the disk nodes 100, 200, 300, and 400 becomes substantially even per time slot.

In the data reallocation for reducing the power consumption, the data reallocation control section 530 calculates, based on the collected access statistical information, the probability that access is not performed to each of the disk nodes 100, 200, 300, and 400 within the given time slot after the data reallocation is executed. Then, the data reallocation control section 530 selects one of data allocation patterns (e.g., assignment patterns of the sliced to the segments), which provides a greater expectation representing the probability that access is not generated to some of the disk nodes within the given time slot. After the data allocation pattern is decided, the data reallocation control section 530 instructs the logical volume management section 510 to reallocate the respective data in accordance with the selected data allocation pattern.

The disk node 100 has a data access section 130, a data management section 140, a slice management information storage section 150, and an operation mode control section 160.

The data access section 130 accesses the data in the storage device 110 in response to a request from the access node 600. More specifically, upon receiving a data read request from the access node 600, the data access section 130 acquires data designated by the read request from the storage device 110 and transmits the acquired data to the access node 600. Also, upon receiving a data write request from the access node 600, the data access section 130 stores data contained in the write request in the storage device 110.

The data management section 140 manages the data in the storage device 110. For example, the data management section 140 monitors data access executed by the data access section 130. When data is written into the primary slice in the storage device 110, the data management section 140 transmits the written data to the disk node managing the secondary slice, which belongs to the same segment, as the primary slice. The data management section 140 of the disk node having received the transmitted data updates the data in the secondary slice. As a result, the identity between the primary slice and the secondary slice is maintained.

Furthermore, the data management section 140 monitors data access executed by the data access section 130 and updates both the contents of the access statistical information stored in the slice management information storage section 150 and a value of the last access time. More specifically, the data management section 140 counts up a value of the number of accesses for the slice to which the accesses are performed in the current time slot, and sets the current time to information indicating the time of the last access to the disk node 100.

Moreover, in response to the slice management information acquisition request from the logical volume management section 510, the data management section 140 transmits the slice management information stored in the slice management information storage section 150 to the logical volume management section 510.

The slice management information storage section 150 has a storage function of storing the slice management information. For example, part of a memory area in the RAM 102 is used as the slice management information storage section 150. The slice management information stored in the slice management information storage section 150 is stored in the storage device 110 when the system is stopped, and is read into the slice management information storage section 150 when the system is started up.

The slice management information storage section 150 further stores the access statistical information. The access statistical information is obtained by collecting the number of accesses to each slice in the storage device 110 per time slot.

The operation mode control section 160 controls not only a shift of the disk node 100 and the storage device 110 to the power saving mode depending on an access condition to the storage device 110, but also a return from the power saving mode. In practice, when access to the storage device 110 is not performed over a given time (e.g., a storage power-saving shift time), the operation mode control section 160 shifts the storage device 110 to the power saving mode. More specifically, when the operation mode control section 160 detects the absence of data access over the storage power-saving shift time, it transmits, to the control node 500, the attribute change request for changing the segment managed by the operation mode control section 160 from the primary slice to the secondary slice. Upon receiving the attribute change instruction from the control node, the operation mode control section 160 changes the designated slice from the primary slice to the secondary slice in the same segment. Thereafter, the operation mode control section 160 outputs, to the storage device 110, the mode change instruction for a change to the power saving mode. As a result, the storage device 110 is shifted to the power saving mode. In the storage device 110 having shifted to the power saving mode, disks of the HDDs 111 to 114 are caused to stop rotation (spin down).

Furthermore, when access to the storage device 110 is not performed over a given time (e.g., a node power-saving shift time), the operation mode control section 160 shifts the disk node 100 to the power saving mode. More specifically, when the operation mode control section 160 detects the absence of data access over the node power-saving shift time, it transmits, to the control node 500, the attribute change request for changing the slice managed by the operation mode control section 160 from the primary slice to the secondary slice. Upon receiving the attribute change instruction from the control node, the operation mode control section 160 changes the designated slice from the primary slice to the secondary slice in the same segment. Thereafter, the operation mode control section 160 shifts the disk node 100 to the power saving mode. In the disk node 100 having shifted to the power saving mode, the operation of the CPU 101 is stopped.

Moreover, when access is performed to the storage device 110 in the state that the disk node 100 or the storage device 110 is in the power saving mode, the operation mode control section 160 makes a shift from the power saving mode to the ordinary operation mode. More specifically, when the storage device 110 is in the power saving mode, the operation mode control section 160 starts to rotate (spin up) the disk of the storage device 110. When the disk node 100 is in the power saving mode, the operation mode control section 160 starts data processing of the disk node 100. For example, the operation mode control section 160 resumes the disk node 100 from the suspended state. Note that, when the disk node 100 is in the power saving mode, the operation mode control section 160 can detect access to the storage device 110 with the WakeOnLAN function built in the communication interface 106.

Each of the other disk nodes 200, 300, and 400 also has similar functions to those of the disk node 100. More specifically, the disk node 200 has a data access section 230, a data management section 240, a slice management information storage section 250, and an operation mode control section 260. The disk node 300 has a data access section 330, a data management section 340, a slice management information storage section 350, and an operation mode control section 360. The disk node 400 has a data access section 430, a data management section 440, a slice management information storage section 450, and an operation mode control section 460. Individual components of the disk nodes 200, 300, and 400 have the same functions as the corresponding components of the disk node 100 which are denoted by the same names.

The functions of individual components of the control node 1, shown in FIG. 1, are basically included in the data reallocation control section 530 of the control node 500 shown in FIG. 6. However, the data reallocation instruction from the data reallocation instruction module if is executed by the logical volume management section 510 in accordance with the instruction from the data reallocation control section 530. Also, the functions of the access statistical information storage module 2b in the disk node 2, shown in FIG. 1, are included in the slice management information storage sections 150, 250, 350, and 450. The functions of the access statistical information update module 2c and the data reallocation module 2d are included in the data management sections 140, 240, 340, and 440. The functions of the operation mode control module 2e are included in the operation mode control sections 160, 260, 360, and 460.

Figure 7:
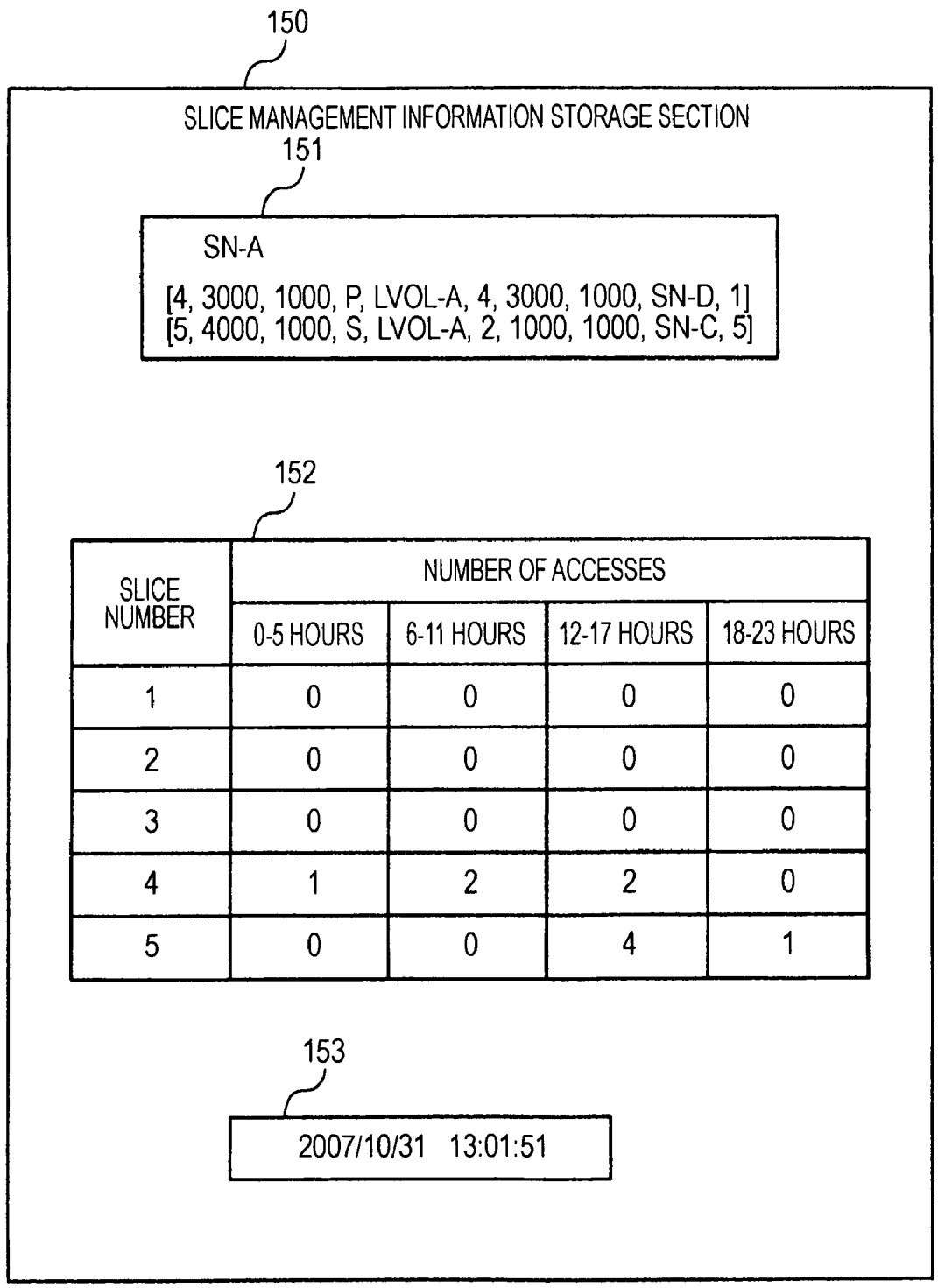
FIG. 7 illustrates a data structure of slice management information.

FIG. 7 illustrates a data structure of the slice management information. The slice management information storage section 150 stores slice management information 151, access statistical information 152, and the last access time 153. Elements of the slice management information 151 are as follows, starting from the left:

Slice number
Start block position (block number corresponding to the head of the relevant slice)
Number of blocks (number of blocks in the slice)
Flag (primary/secondary)
Logical volume identifier
Segment number
Start block position of the logical volume
Number of blocks in the logical volume
Paired disk node identifiers
Paired slice numbers The slice management information 151 shown in FIG. 7 constitutes a part of the logical volume 700 shown in FIG. 5. For example, the slice having the slice number "4" in the slice management information 151 with the node identifier "SN-A" is the primary slice having the segment number "4" in the "LVOL-A", and the paired slice is the slice having the segment number "1" in the "SN-D".

The access statistical information 152 is in the form of a table having columns of "slice number" and "number of accesses". In the column of "slice number", the slice numbers of each of the slices arranged in the storage device 110 are set.

The column of "number of accesses" is further divided into a plurality of sub-columns per time slot. In an example shown in FIG. 7, there are sub-columns of "0-5 hours", "6-11 hours", "12-17 hours" and "18-23 hours". Herein, "0-5 hours" means a time slot after 0 hours (including just 0 hours, i.e., 0 o'clock a.m.), but before 6 hours (not including just 6 hours, i.e., 6 o'clock a.m.). Each sub-column of "time slot" sets therein the number of times accesses are performed to one slice in the relevant time slot (i.e., the number of accesses). In the access statistical information 152, the number of accesses in the time slot is updated, including the time of day at which the access has been performed, upon access to each slice.

The last access time 153 represents the time of data at which the last access has been performed to the storage device 110. The last access time 153 is updated upon each access to the storage device 110.

Slice management information similar to the slice management information 151, shown in FIG. 7, is also stored in each of the slice management information storage sections 250, 350, and 450 of the other disk nodes 200, 300, and 400. At the startup of the system, the control node 500 collects the slice management information from each of the disk nodes 100, 200, 300, and 400 and stores the collected slice management information in the slice management information group storage section 520.

Figure 8:
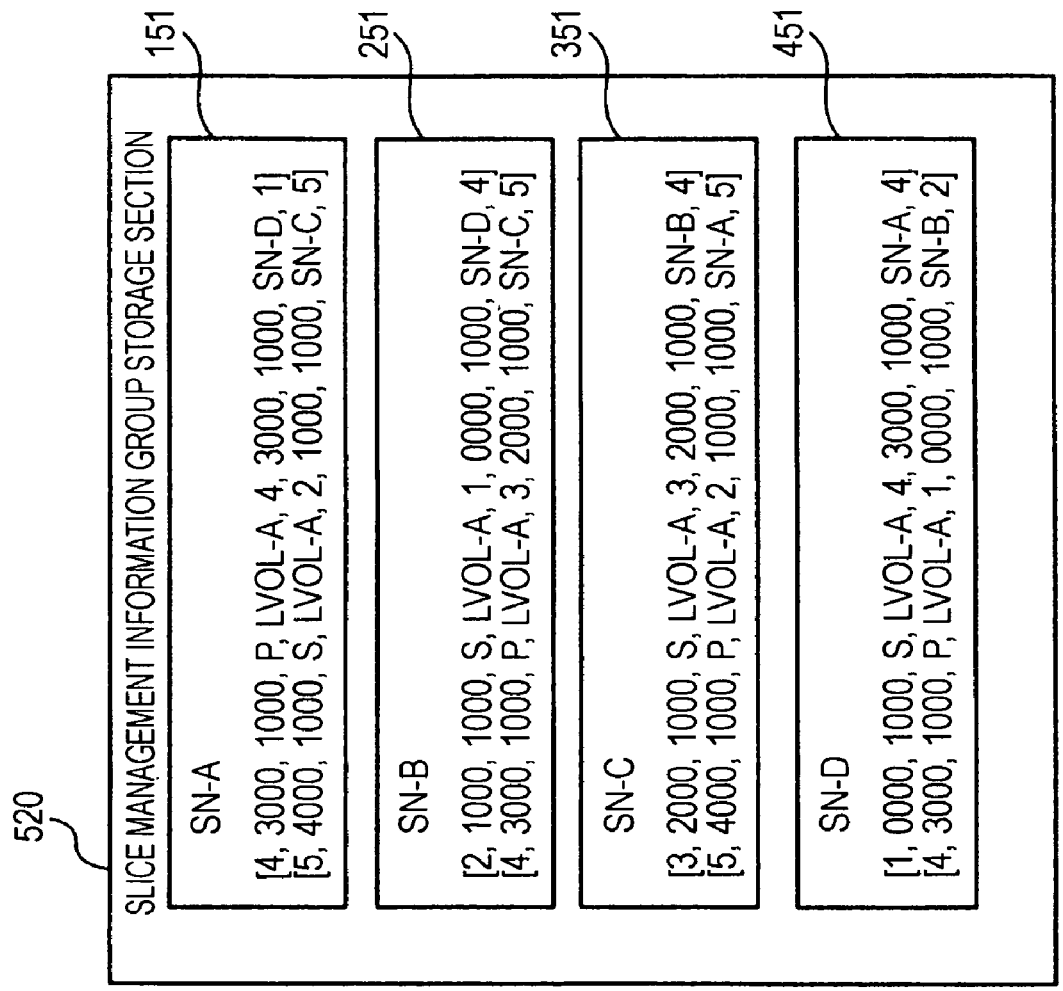
FIG. 8 illustrates a data structure of a slice management information group storage section.

FIG. 8 illustrates a data structure of the slice management information group storage section. The slice management information group storage section 520 stores sets of slice management information 151, 251, 351, and 451 having been collected as described above. The slice management information 151 is obtained from the disk node 100 (with the node identifier "SN-A"). The slice management information 251 is obtained from the disk node 200 (with the node identifier "SN-B"). The slice management information 351 is obtained from the disk node 300 (with the node identifier "SN-C"). The slice management information 451 is obtained from the disk node 400 (with the node identifier "SN-D").

In the multi-node storage system thus constructed, data reallocation is executed periodically. There are two types of data reallocation, one for increasing the processing capability, and the other for reducing the power consumption. In the data reallocation for increasing the processing capability, data is reallocated such that accesses to the disk nodes 100, 200, 300, and 400 become substantially even. In the data reallocation for saving the power consumption, data is reallocated such that the number of disk nodes having low access frequency is increased. Details of a data reallocation process for reducing the power consumption will be described below.

The data reallocation process for reducing the power consumption can be executed in two ways.

In a first data reallocation process, two slices are selected at random and the propriety of mutually exchanging those two slices in assignment to segments is studied. After repeating the slice selection a given number of times, data is reallocated so as to provide data allocation in which a large reduction of the power consumption is expected among the repeated slice selections. The first data reallocation process is effective for the case where the number of the disk nodes and the number of the segments are large and all data allocation patterns (e.g., all allocation patterns of the slices assignable to the segments) cannot be verified.

In a second data reallocation process, data is reallocated so as to provide data allocation in which a large reduction of the power consumption is expected among all allocation patterns of the slices assignable to the segments. The second data reallocation process is effective for the case where the number of the disk nodes and the number of the segments are not so large and all data allocation patterns can be verified.

It is assumed that whether to execute the first data reallocation process or the second data reallocation process is previously set in the data reallocation control section 530 by an administrator. The administrator decides which one of the first and second data reallocation processes is to be executed, taking into account, for example, the interval of execution of the data reallocation and the time required for the control node 500 to verify one slice allocation pattern. The data reallocation process is executed at given timing by the data reallocation control section 530. The times of executing the data reallocation process (or the interval of execution thereof) are previously set with an operation input from the administrator in the memory (RAM 502) which is managed by the data reallocation control section 530.

Figure 9:
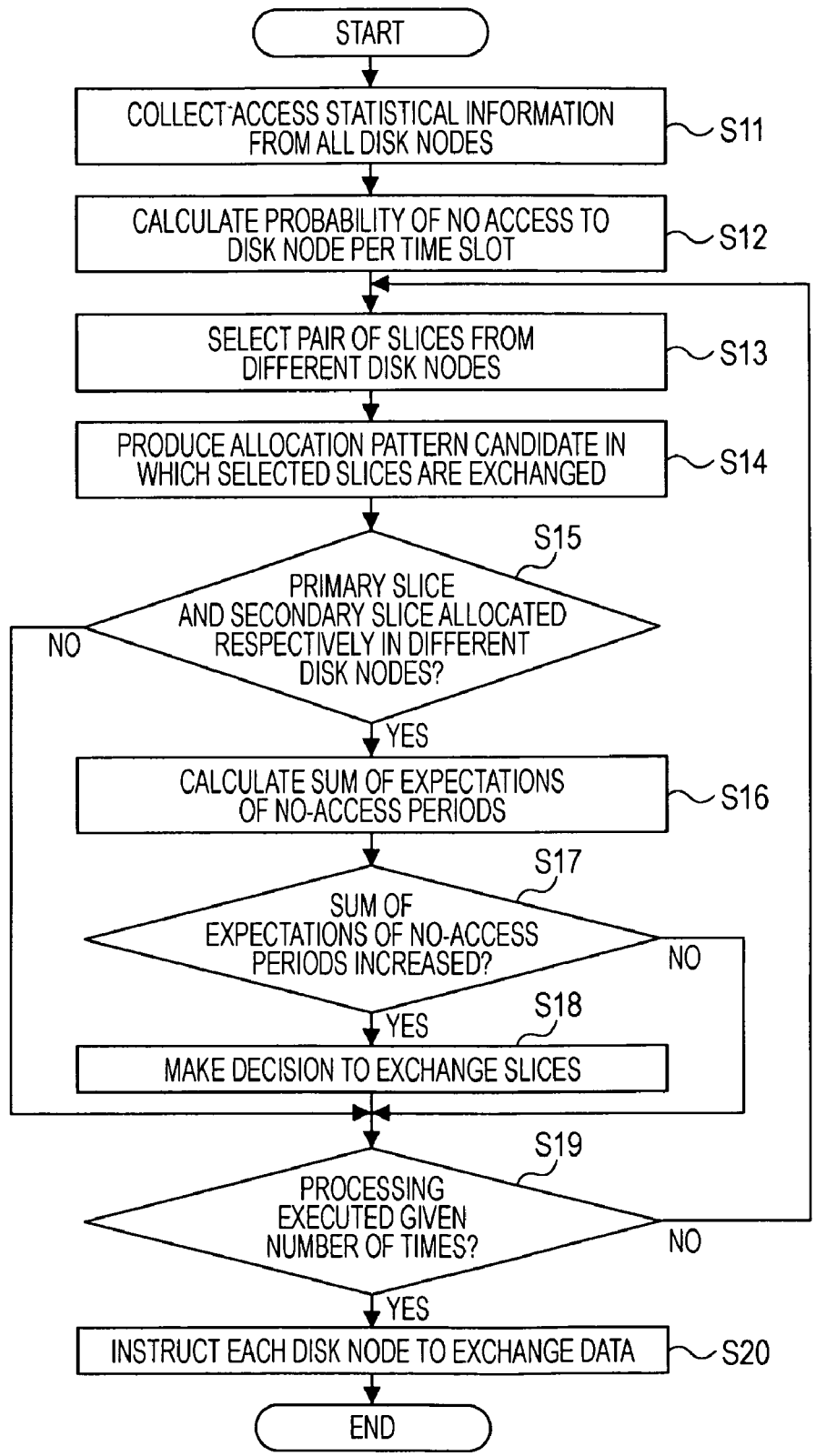
FIG. 9 illustrates a flowchart showing procedures of a first data reallocation process.

FIG. 9 is a flowchart showing procedures of the first data reallocation process. The procedures shown in FIG. 9 will be described successively in order of step numbers.

[Step S11] The data reallocation control section 530 collects the access statistical information from all the disk nodes. More specifically, the data reallocation control section 530 transmits an access statistical information acquisition request to each of the data management sections 140, 240, 340, and 440 of the disk nodes 100, 200, 300, and 400. In response to the acquisition request, the data management sections 140, 240, 340, and 440 respectively acquire the access statistical information from the slice management information storage sections 150, 250, 350, and 450, and transmit the acquired access statistical information to the control node 500. Thus, the data reallocation control section 530 acquires the access statistical information transmitted from the disk nodes 100, 200, 300, and 400.

At that time, the data reallocation control section 530 further acquires, through the logical volume management section 510, the slice management information stored in the slice management information group storage section 520. Based on the acquired slice management information, the data reallocation control section 530 can recognize the segments 710, 720, 730, and 740, which are arranged in the logical volume 700, and the slices assigned to the segments.

[Step S12] The data reallocation control section 530 calculates, per time slot, a probability that access is not performed to each of the disk nodes 100, 200, 300, and 400. More specifically, the calculation is executed as follows.

First, for each slice, a probability p of no access to the relevant slice (i.e., a no-access-to-data probability) is obtained. Assuming here that the probability of no access to the i-th slice is pi ("i" being a natural number), the probability of no access to each slice can be calculated from the following formula:

$$p_i = 2^{-u} (u = \alpha \times c_i) \quad (1)$$

where $\alpha$ is a preset positive number, and ci is the number of accesses performed to the i-th slice within the time slot considered as a determination target. According to the formula (1), the probability of no access is reduced as the number of accesses increases. The probability p is calculated per slice and per time slot.

[Step S13] The data reallocation control section 530 selects a pair of slices from different disk nodes at random. The slices selected at this time may include slices which are not currently assigned to the segments.

[Step S14] The data reallocation control section 530 produces an allocation pattern candidate representing the case where the slices selected in step S13 are mutually exchanged from the current assignment state of the slices to the segments. More specifically, assuming that the slices selected in step S13 are a "slice a" and a "slice b", the data reallocation control section 530 assigns the "slice b" to the segment to which the "slice a" has been so far assigned, and assigns the "slice a" to the segment to which the "slice b" has been so far assigned. In the exchange of the slices, the attribute of the relevant slice (e.g., whether it is the primary slice or the secondary slice) is also taken over as the attribute of the partner slice in the pair.

[Step S15] With respect to the allocation pattern candidate produced in step S14, the data reallocation control section 530 determines for each of all the segments whether the primary slice and the secondary slice are located respectively in different disk nodes. If the primary slice and the secondary slice are located respectively in different disk nodes, the processing is advanced to step S16. If there is at least one segment of which primary slice and secondary slice are located in the same disk node, the processing is advanced to step S19.

[Step S16] The data reallocation control section 530 calculates, for the allocation pattern candidate, the sum of respective expectations t of no-access periods during which access is not performed to the disk nodes. To that end, the data reallocation control section 530 calculates a probability q of no-access to each disk node (e.g., a no-access-to-node probability) based on the probability p of no access to each slice by using the following formula $$q = p_1 \times p_2 \times \quad (2)$$

The probability q is calculated per time slot. Assuming here that the probability of no access to each disk node in the k-th time slot ("k" being a natural number) is $q_k$, the expectation t of the no-access period during which access is not performed to the relevant disk node can be calculated from the following formula:

$$t = (q_1 + q_2 + \ldots) \times \beta \quad (3)$$

where β is a preset constant (positive number). The positive number β may be set to a different value for each disk node. For example, by setting a value of β to be larger for one disk node which consumes larger power in the ordinary operation than the other disk nodes, the resulting influence upon the time during which access is not performed to the disk node having the larger power consumption can be increased.

The expectation t is calculated for each disk node. The data reallocation control section 530 calculates the respective expectations t for all the disk nodes.

[Step S17] The data reallocation control section 530 determines whether the sum of the expectations t of the no-access periods resulting when data is allocated in accordance with the allocation pattern candidate is larger or not than that obtained with the currently best allocation pattern candidate. If the sum of the expectations is determined to become larger, the processing is advanced to step S18. If the sum of the expectations is determined not to become larger, the processing is advanced to step S19.

[Step S18] The data reallocation control section 530 makes a decision to exchange the slices selected in step S13 and sets the allocation pattern candidate produced in step S14 as the best allocation pattern candidate.

[Step S19] The data reallocation control section 530 determines whether or not the processing of steps S13 to S18 has been executed a given number of times. The given number of times is previously set in the data reallocation control section 530. If the processing of steps S13 to S18 has been executed the given number of times, the processing is advanced to step S20. If the number of the executions does not reach the given number of times, the processing is advanced to step S13.

[Step S20] The data reallocation control section 530 makes a decision to employ the currently best allocation pattern candidate and instructs the disk nodes 100, 200, 300, and 400 to exchange the data in accordance with the currently best allocation pattern candidate. The processing is then brought to an end.

As described above, data can be reallocated so as to increase a value (e.g., the sum of the expectations) resulting from tallying, for all the time slots, the no-access period expectations each calculated per time slot. The data reallocation includes a slice change process of assigning the slices to the segments and a process of moving the data in the slices in accordance with the details of the slice change.

The second data reallocation process will be described below.

Figure 10:
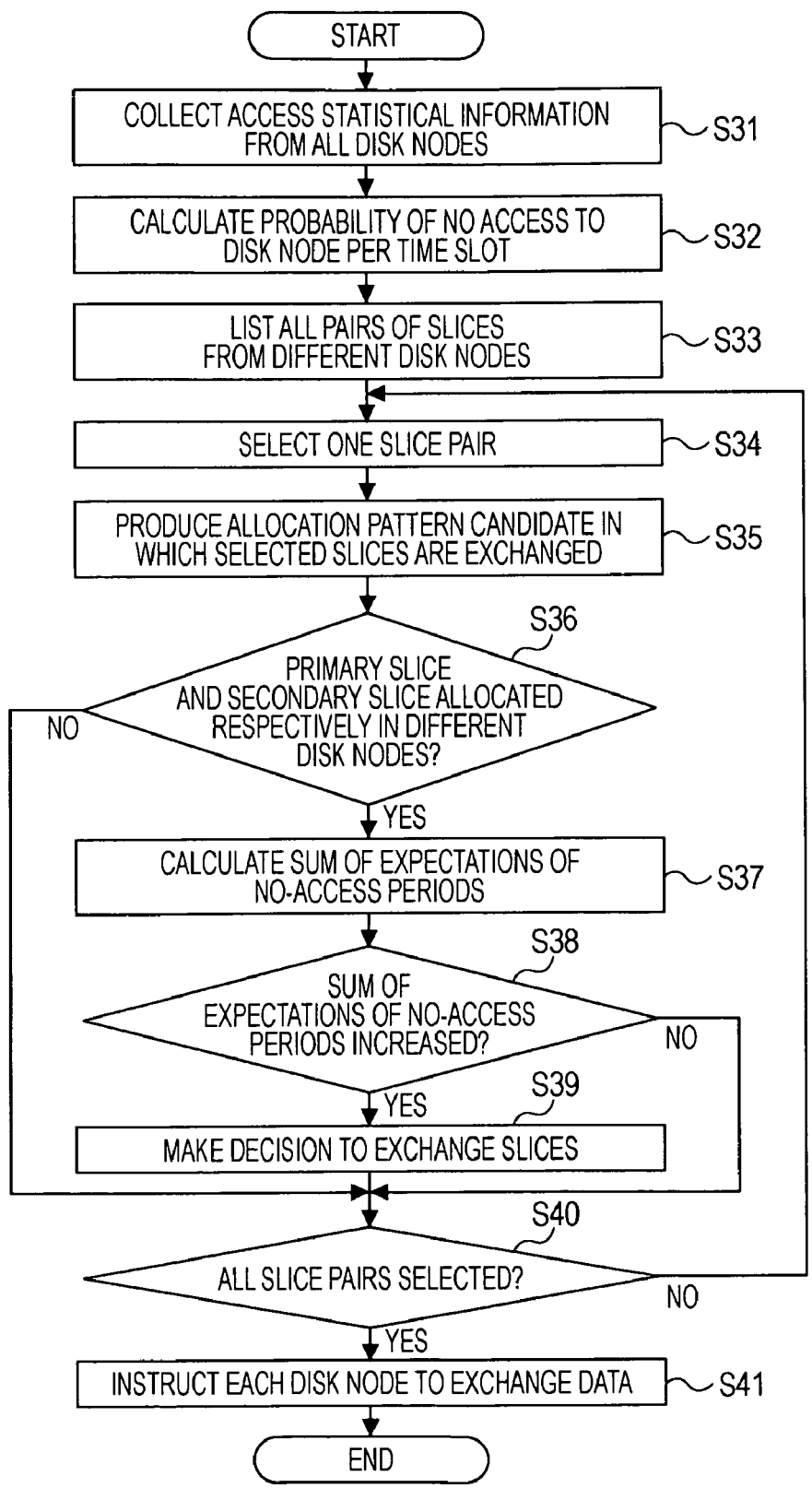
FIG. 10 illustrates a flowchart showing procedures of a second data reallocation process.

FIG. 10 is a flowchart showing procedures of the second data reallocation process. The procedures shown in FIG. 10 will be described successively in order of step numbers.

[Step S31] The data reallocation control section 530 collects the access statistical information from all the disk nodes. Details of the processing in step S31 are similar to those in step S11 of FIG. 9.

[Step S32] The data reallocation control section 530 calculates, per time slot, a probability that access is not performed to each of the disk nodes 100, 200, 300, and 400. Details of the processing in step S32 are similar to those in step S12 of FIG. 9.

[Step S33] The data reallocation control section 530 lists all pairs of slices which can be produced by selecting every slice from two different disk nodes.

[Step S34] The data reallocation control section 530 selects one not-yet-selected pair from among the slice pairs listed in step S33.

[Step S35] The data reallocation control section 530 produces an allocation pattern candidate representing the case where the slices selected in step S34 are mutually exchanged from the current assignment state of the slices to the segments. Details of the processing in step S35 are similar to those in step S14 of FIG. 9.

[Step S36] With respect to the allocation pattern candidate produced in step S35, the data reallocation control section 530 determines for all the segments whether the primary slice and the secondary slice are located respectively in different disk nodes. If the primary slice and the secondary slice are located respectively in different disk nodes, the processing is advanced to step S37. If there is at least one segment of which a primary slice and a secondary slice are located in the same disk node, the processing is advanced to step S40.

[Step S37] The data reallocation control section 530 calculates the sum of expectations t of no-access periods during which access is not performed to respective disk nodes in the allocation pattern candidate. Details of the processing in step S37 are similar to those in step S36 of FIG. 9.

[Step S38] The data reallocation control section 530 determines whether the sum of the expectations of the no-access periods resulting when data is allocated in accordance with the allocation pattern candidate is larger than that obtained with the currently best allocation pattern candidate. If the sum of the expectations is determined to become larger, the processing is advanced to step S39. If the sum of the expectations is determined not to become larger, the processing is advanced to step S40.

[Step S39] The data reallocation control section 530 makes a decision to exchange the slices selected in step S34 and sets the allocation pattern candidate produced in step S35 as the best allocation pattern candidate.

[Step S40] The data reallocation control section 530 determines whether the slice pairs listed up in step S33 have all been selected in step S34. If the slice pairs have all been selected, the processing is advanced to step S41. If one or more slice pairs remain unselected, the processing is advanced to step S34.

[Step S41] The data reallocation control section 530 makes a decision to employ the currently best allocation pattern candidate and instructs the disk nodes 100, 200, 300, and 400 to exchange the data in accordance with the currently best allocation pattern candidate. The processing is then brought to an end.

As described above, data can be reallocated so as to increase a value (e.g., the sum of the expectations) resulting from tallying, for all the time slots, the no-access period expectations each calculated per time slot.

The process of shifting the disk nodes 100, 200, 300, and 400 to the power saving mode will be described below. The process of shifting to the power saving mode can be executed in two ways, one shifting the HDD to the power saving mode, and the other shifting the disk node itself to the power saving mode. Details of the process of shifting to the power saving mode is described in connection with, by way of example, the case of shifting the disk node 100 to the power saving mode.

Figure 11:
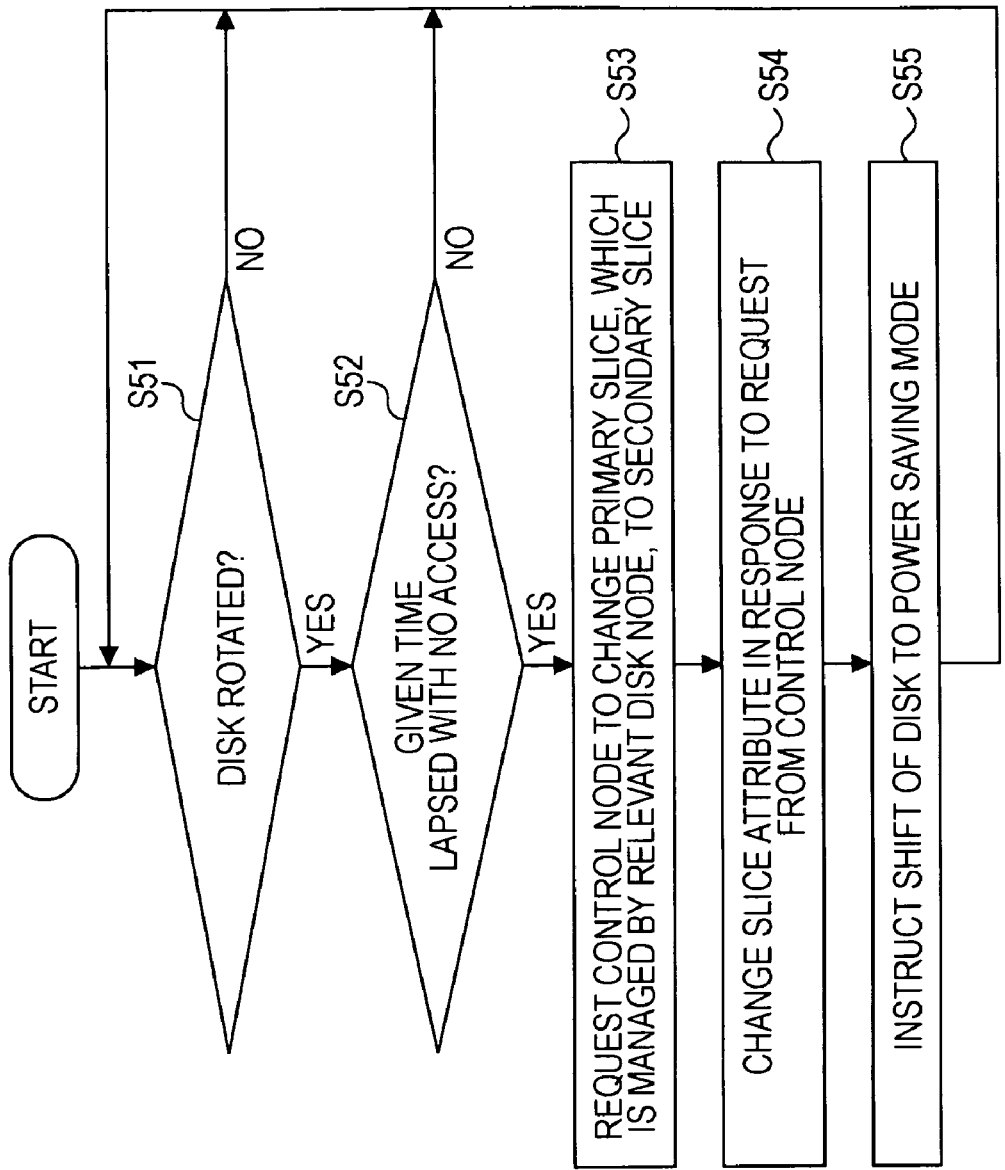
FIG. 11 illustrates a flowchart showing procedures of a process of shifting a HDD to a power saving mode.

FIG. 11 is a flowchart showing procedures of the process of shifting the HDD to the power saving mode. The procedures shown in FIG. 11 will be described successively in order of step numbers. The shifting process of FIG. 11 is continuously executed during the operation of the disk nodes 100, 200, 300, and 400.

[Step S51] The operation mode control section 160 determines whether or not the disk of the selected HDD is rotated. If the disk is rotated, the processing is advanced to step S52. If the disk is not rotated, the processing of step S51 is repeated. Herein, the determination that the disk of the selected HDD is not rotated is made when the HDD is in the power saving mode.

In this embodiment, the plurality of HDDs 111 to 114 operate substantially as one HDD according to RAID5. In other words, when access to the storage device 110 is generated, the access is performed to data stored in the HDDs 111 to 114 in a distributed manner. For that reason, the four HDDs 111 to 114 are shifted to the power saving mode at the same time. Thus, whether or not the disk is rotated is determined by transmitting, from the operation mode control section 160, a command instructing the storage device to notify the operation state, and by receiving a response from the storage device.

[Step S52] The operation mode control section 160 determines whether a given time (e.g., a shift time of the disk to the power saving mode) has lapsed with no access to the disk node 100. More specifically, the operation mode control section 160 refers to the last access time 153 in the slice management information storage section 150 and calculates a time lapsed from the last access time to the current time. Then, the operation mode control section 160 compares the preset shift time of the disk to the power saving mode with the time lapsed from the last access. If the lapsed time is equal to or longer than the shift time of the disk to the power saving mode, the operation mode control section 160 determines that the given time has lapsed. If the lapsed time is shorter than the shift time of the disk to the power saving mode, the operation mode control section 160 determines that the given time has not yet lapsed.

[Step S53] The operation mode control section 160 requests the control node 500 to change the primary slice managed by the disk node 100 to the secondary slice. More specifically, the operation mode control section 160 refers to the slice management information 151 in the slice management information storage section 150. Then, the operation mode control section 160 acquires the slice number of the relevant slice. In the case of the slice management information 151 shown in FIG. 7, for example, it is understood that the slice having the slice number "4" is the primary slice.

After acquiring the slice number of the primary slice, the operation mode control section 160 requests the control node 500 to change the attribute of the relevant slice to the secondary slice by designating the acquired slice number. Correspondingly, the logical volume management section 510 of the control node 500 makes a decision to exchange the primary slice and the secondary slice regarding the segment to which the designated slice is assigned. Then, the logical volume management section 510 instructs the disk nodes having the relevant primary slice and secondary slice to change the attributes of those slices.

[Step S54] The operation mode control section 160 changes the primary slice to the secondary slice in accordance with the instruction from the control node 100. More specifically, the operation mode control section 160 changes, in the slice management information 151, a value of the item "flag" for the slice, which has a value of "P (primary)" in the item "flag" thereof, to "S (secondary)".

[Step S55] The operation mode control section 160 instructs the storage device 110 to shift to the power saving mode. As a result, the storage device 110 stops (spins down) the rotation of the disks of the HDDs 111 to 114 for shifting to the power saving mode. Thereafter, the processing is advanced to step S51.

The process of shifting the disk node to the power saving mode will be described below.

Figure 12:
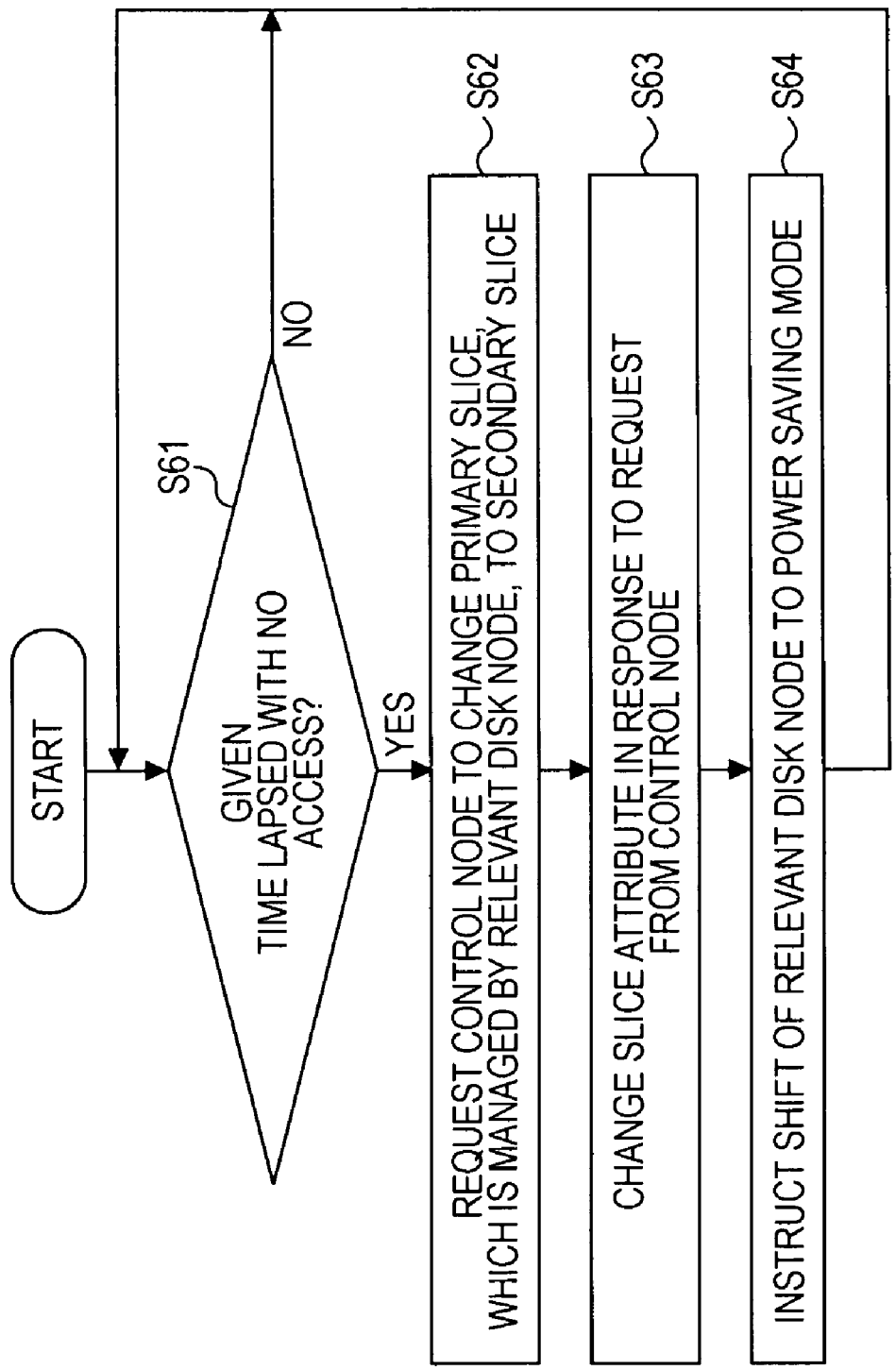
FIG. 12 illustrates a flowchart showing procedures of a process of shifting the disk node to a power saving mode.

FIG. 12 is a flowchart showing procedures of the process of shifting the disk node to the power saving mode. The procedures shown in FIG. 12 will be described successively in order of step numbers. The shifting process of FIG. 12 is continuously executed during the operation of the disk nodes 100, 200, 300, and 400.

[Step S61] The operation mode control section 160 determines whether a given time (e.g., a shift time of the node to the power saving mode) has lapsed with no access to the disk node 100. Details of the processing of step S61 are similar to those of step S52 in FIG. 11 except that the shift time of the disk to the power saving mode is replaced with the shift time of the node to the power saving mode. Note that the shift time of the node to the power saving mode is set to a larger value than the shift time of the disk to the power saving mode.

[Step S62] The operation mode control section 160 requests the control node 500 to change the primary slice managed by the disk node 100 to the secondary slice. Details of the processing of step S62 are similar to those of step S53 in FIG. 11.

[Step S63] The operation mode control section 160 changes the primary slice to the secondary slice in accordance with the instruction from the control node 100. Details of the processing of step S63 are similar to those of step S54 in FIG. 11.

[Step S64] The operation mode control section 160 shifts the disk node 100 itself to the power saving mode. More specifically, the operation mode control section 160 instructs the OS in the disk node 100 to shift to the power saving mode. Responsively, the OS in the disk node 100 saves the data in the RAM 102 to the HDD 103 and turns off power supplied to the disk node 100. Even in the state where the power supplied to the disk node 100 is turned off, the minimum amount of power for accepting a startup request via the network 10 is supplied to the communication interface 108. The processing is then advanced to step S61.

With the processes shown in FIGS. 11 and 12, when there is no access for the given time, the storage device and the disk node are shifted to the power saving mode, and therefore the power consumption is reduced. The storage device and the disk node in the power saving mode can be returned to an ordinary mode when access is externally applied.

Figure 13:
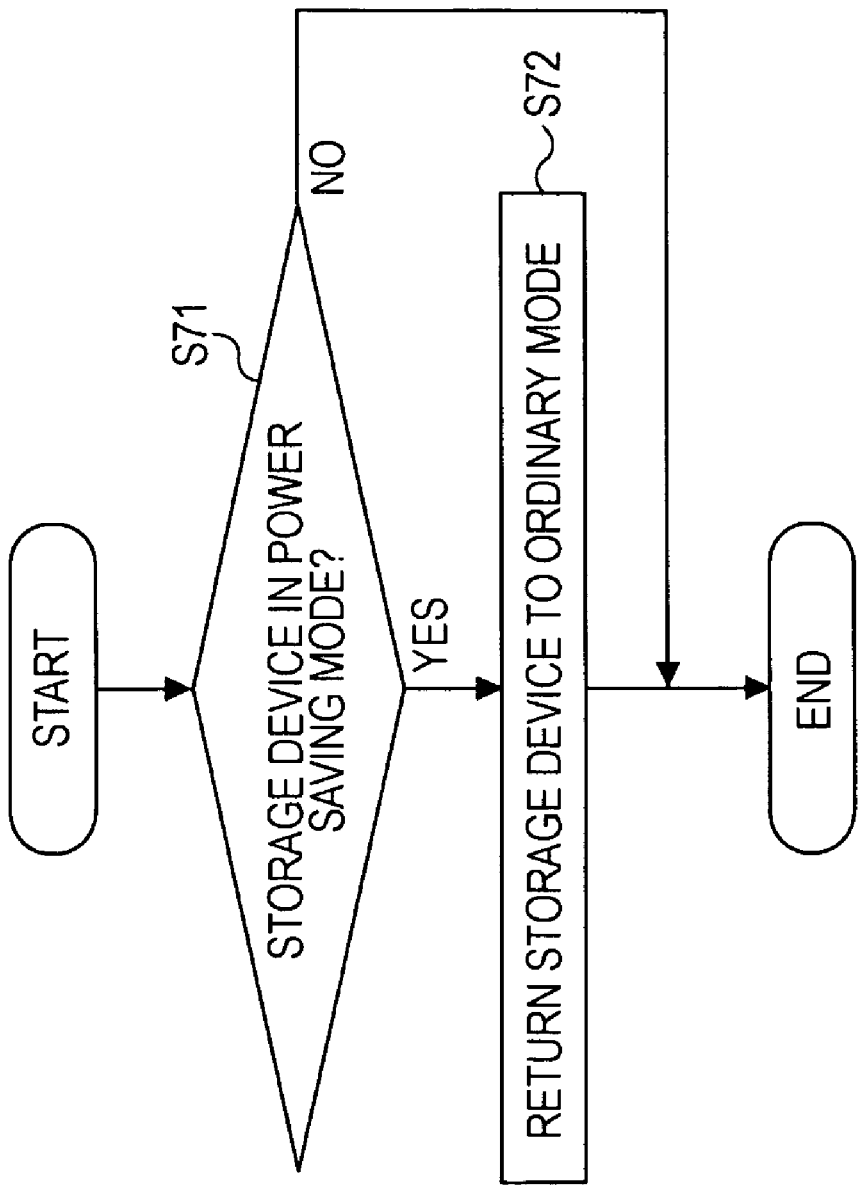
FIG. 13 illustrates a flowchart showing procedures of a process of returning a storage device to an ordinary mode.

FIG. 13 is a flowchart showing procedures of a process of returning the storage device to the ordinary mode. The procedures shown in FIG. 13 will be described successively in order of step numbers. The returning process of FIG. 13 is executed when an access request is input to the disk node 100.

[Step S71] The operation mode control section 160 determines whether the storage device 110 is in the power saving mode or not. If the storage device 110 is in the power saving mode, the processing is advanced to step S72. If the storage device 110 is not in the power saving mode, the processing is brought to an end.

[Step S72] The operation mode control section 160 returns the storage device 110 from the power saving mode to the ordinary mode. More specifically, the operation mode control section 160 transmits a request for starting to rotate (spin up) the disk to the storage device 110. As a result, the storage device 110 starts to rotate the disks of the HDDs 111 to 114. The processing is then brought to an end.

Next, a description is made on a process of returning the disk node 100 to the ordinary mode when the disk node 100 is in the power saving mode. The process of returning the disk node 100 to the ordinary mode is executed by cooperation of the access node 600, the control node 500, and the disk node 100 when data access is input from the access node 600 to the disk node 100.

Figure 14:
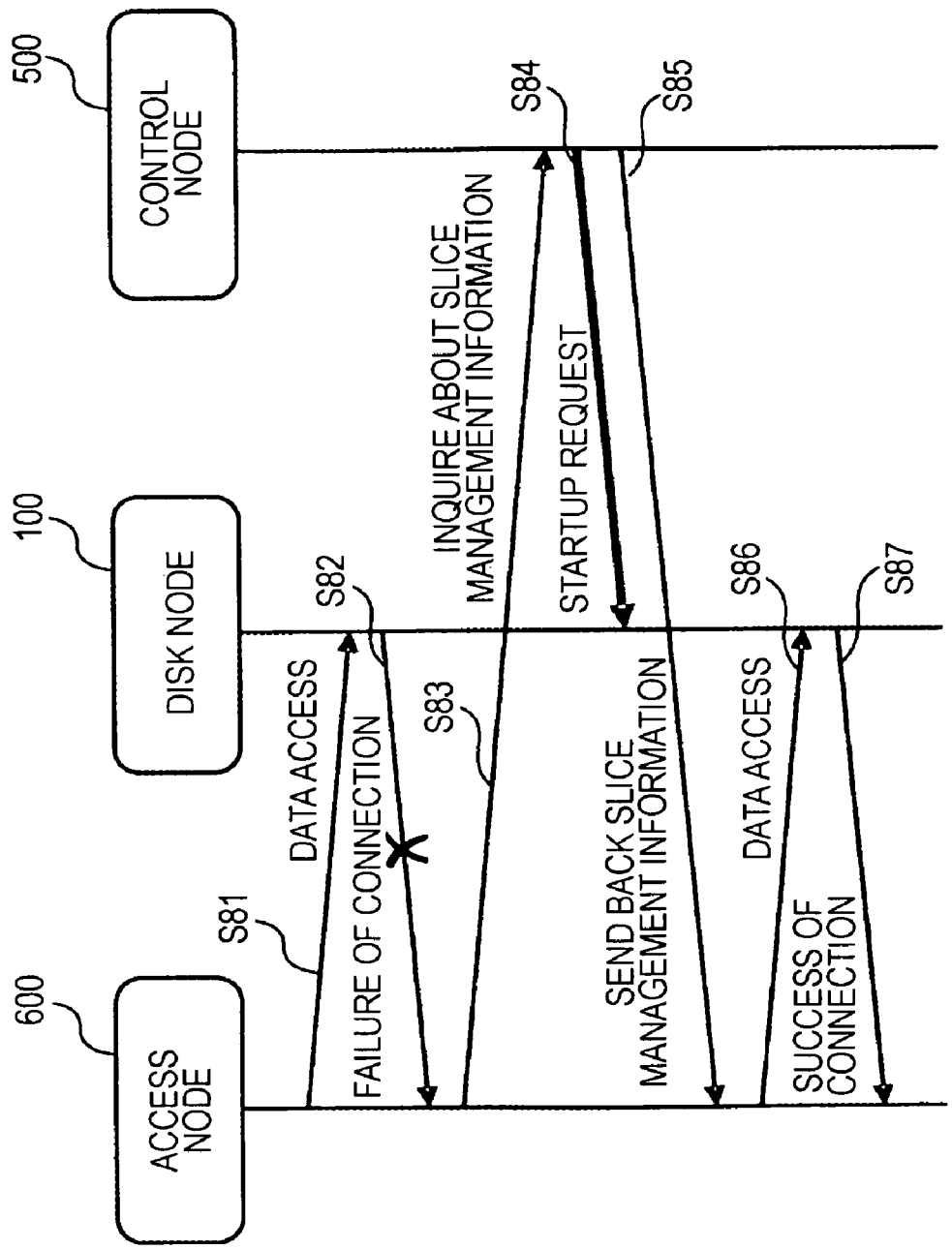
FIG. 14 illustrates a sequence chart showing procedures of data access when the disk node is in the power saving mode.

FIG. 14 is a sequence chart showing procedures of data access when the disk node is in the power saving mode. The procedures shown in FIG. 14 will be described successively in order of step numbers.

[Step S81] The access node 600 requests the disk node 100 to perform data access to the disk. At this time, the disk node 100 is assumed to be in the power saving mode.

[Step S82] The access node 600 recognizes a failure of connection because of no response from the disk node 100.

[Step S83] The access node 600 asks a question to the control node 500 about the slice management information. This question includes information indicating that the data access to the disk node 100 has failed.

More specifically, the access node 600 receives the slice management information from the control node 500 at the startup of the system operation. When the slice management information is updated, the control node 500 transmits the updated slice management information to the access node 600. Therefore, the access node 600 can perform data access based on the latest slice management information. However, if the slice management information is not updated to the latest state for some reason, the data access from the access node 600 may fail. In view of the above situation, the system is designed such that, if the data access to the disk node 100 has failed, the access node 600 acquires the latest slice management information from the control node 500 and performs the data access again based on the acquired slice management information.

[Step S84] The control node 500 recognizes the generation of access to the disk node 100 upon receiving the inquiry regarding the slice management information, and the control node 500 transmits a startup request to the disk node 100. In response to the startup request, the disk node 100 is started up.

[Step S85] The control node 500 sends back the slice management information to the access node 600.

[Step S86] The access node 600 tries to conduct data access to the disk node 100 again.

[Step S87] The disk node 100 sends back data to the access node 600.

Processing executed by the control node 500 when returning the disk node 100 to the ordinary mode will be described in detail below.

Figure 15:
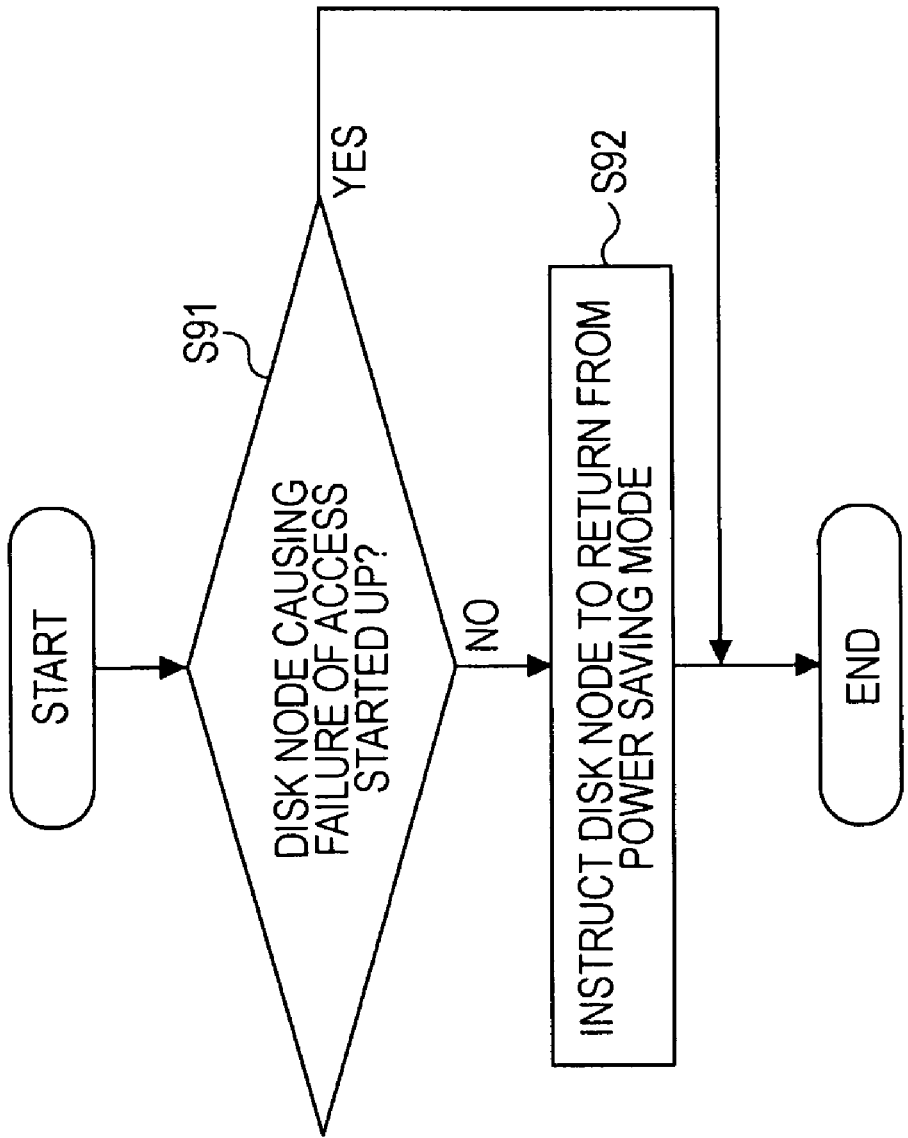
FIG. 15 illustrates a flowchart showing procedures of a process of returning the disk node to the ordinary mode.

FIG. 15 is a flowchart showing procedures of the process of returning the disk node to the ordinary mode. The procedures shown in FIG. 15 will be described successively in order of step numbers. The returning process of FIG. 15 is executed when information indicating a failure of access to the disk node 100 is notified from the access node 600 to the control node 500.

[Step S91] The logical volume management section 510 determines whether the disk node 100 for which the data access has failed is started up or not. Whether the disk node 100 is started up can always be recognized, for example, by periodically transmitting a communication confirmation command (ping) to the disk node 100 from the logical volume management section 510. If the disk node 100 is started up, the processing is brought to an end. If the disk node 100 is not started up, the processing is advanced to step S92.

[Step S92] The logical volume management section 510 instructs the disk node 100 to return from the power saving mode. More specifically, the logical volume management section 510 transmits a signal indicating a system startup request to the disk node 100. That signal is received by the communication interface 106 of the disk node 100. As a result, the communication interface 106 recognizes the system startup request and starts up the disk node 100.

If access has failed in spite of the disk node 100 being started up, the control node 500 executes an ordinary error process. In the event of a failure in the disk node 100, for example, the logical volume management section 510 executes data reallocation by assigning, to the segment to which a slice in the storage device 110 has been so far assigned, a slice in another storage device.

As described above, data can be reallocated so as to provide the disk node to which access has not been performed for a certain time or longer. An example of the data reallocation will be described in detail below.

When data is reallocated, the data reallocation control section 530 collects the access statistical information from the disk nodes 100, 200, 300, and 400.

FIG. 16 illustrates an example of the collected access statistical information. The data reallocation control section 530 stores sets of access statistical information 531, 532, etc. in a memory (e.g., the RAM 502). The sets are assigned with node identifiers representing respective collection sources. Furthermore, the data reallocation control section 530 calculates the probability p of no access for each slice. In this embodiment, the probability p of no access to the relevant slice is calculated per time slot based on the number of accesses to each slice per time slot by using the above-mentioned formula (1).

Figure 17:
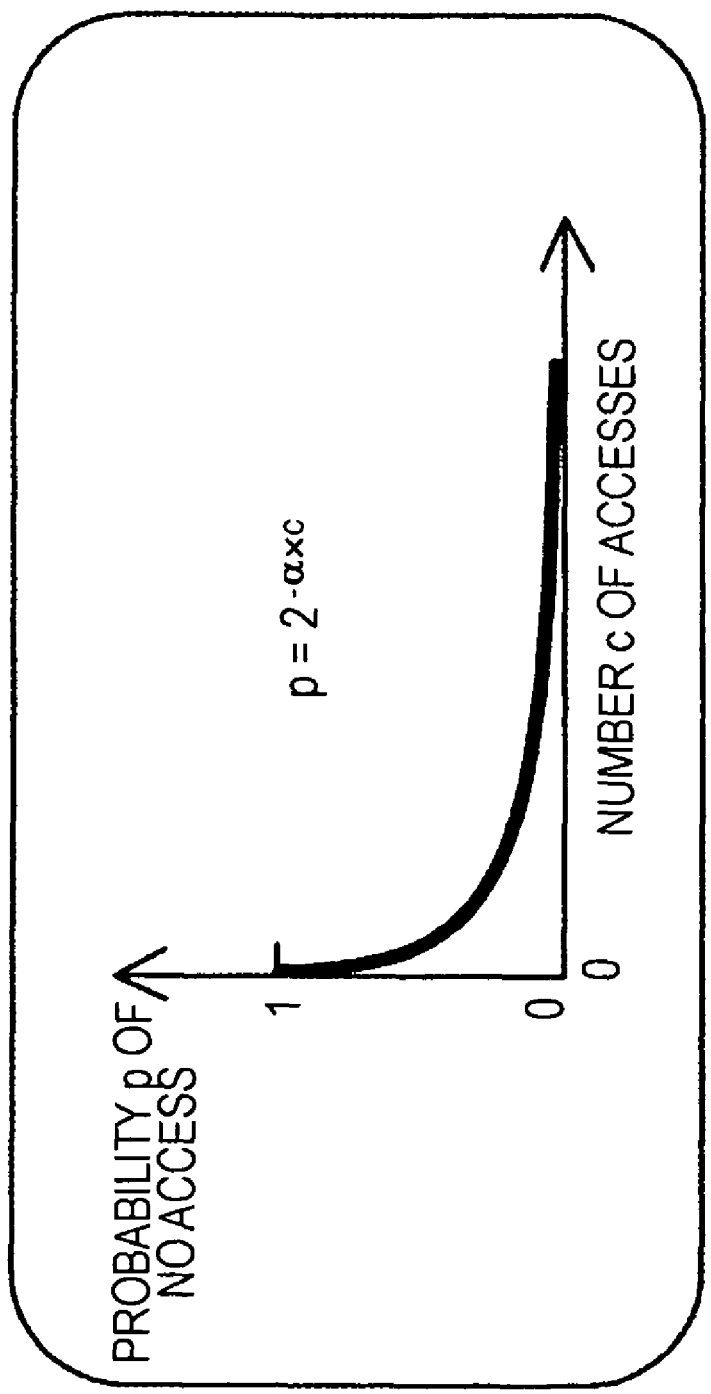
FIG. 17 illustrates a graph showing the relationship between the number of accesses and the probability of no access.

FIG. 17 is a graph showing the relationship between the number of accesses and the probability of no access. In the graph of FIG. 17, the horizontal axis represents the number c of accesses, and the vertical axis represents the probability p of no access. The formula (1) is expressed by a power of 2 with an exponent given by a value resulting from multiplying the number c of accesses by a negative number ($-\alpha$). Thus, as shown in FIG. 17, the probability p of no access has a maximum value "1" when the number c of accesses is 0, and has a smaller value as the number c of accesses increases.

Next, the probability of no access to each disk node is calculated per time slot based on the probability of no access to each slice (thread) by using the above-mentioned formula (2).

Figure 18:
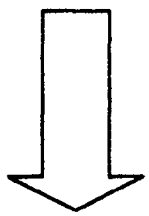
FIG. 18 illustrates a table showing the probability of no access to each slice and each disk node per time slot in a current data allocation pattern.

FIG. 18 is a table showing the probability of no access per time slot for each slice and each disk node in a current data allocation pattern. In an example of FIG. 18, the constant $\alpha$ in the formula (1) is set to "1", and the constant $\beta$ in the formula (2) is also set to "1". The probability of no access to each slice is obtained by rounding a calculated value to one decimal.

As shown in FIG. 18, the probability of no access per time slot is calculated for each slice. The calculated value is stored in the memory (RAM 502) managed by the data reallocation control section 530 in a corresponding relation to a set of the node identifier of each disk node and the slice number of each slice. Though not shown in FIG. 18, since there is no access to the slice that is not assigned to any segment (i.e., the number of accesses to the relevant slice is "0"), the probability of no access to the relevant slice is "1".

Then, the probability of no access to each disk node per time slot is calculated by using the formula (2), as indicated in a lower part of FIG. 18. The calculated value is stored in the memory (RAM 502) managed by the data reallocation control section 530 in a corresponding relation to the node identifier of each disk node.

An expectation of the no-access period is calculated for each disk node based on the probability of no access to the disk node per time slot by using the above-mentioned formula (3). In an example of FIG. 18, the expectation of the no-access period for the disk node 100 having the node identifier "SN-A" is "0.4", and the expectation of the no-access period for the disk node 200 having the node identifier "SN-B" is "1.33".

The sum of the respective expectations of the no-access periods for the disk nodes is provided as an expectation of the no-access period for the entire system. For simplicity of the explanation, attention is paid to the disk node 100 having the node identifier "SN-A" and the disk node 200 having the node identifier "SN-B". The sum of the respective expectations of the no-access periods for the two disk nodes 100 and 200 is, for example, "1.73".

In the above-described state, an allocation pattern candidate is produced by selecting the slice number "5" with the node identifier "SN-A" and the slice number "2" of the disk node 200 with the node identifier "SN-B", and by mutually exchanging the selected slices. More specifically, it is understood from FIG. 5 that, at the present, the slice of the slice number "5" with the node identifier "SN-A" is the secondary slice of the second segment, and the slice of the slice number "2" with the node identifier "SN-B" is the secondary slice of the first segment. Here, those two slices are mutually exchanged such that the slice of the slice number "5" with the node identifier "SN-A" is set to the secondary slice of the first segment, and the slice of the slice number "2" with the node identifier "SN-B" is set to the secondary slice of the second segment.

On that occasion, the data reallocation control section 530 confirms that the primary slice and the secondary slice assigned to the same segment are not managed by the same disk node. Because there is no problem in this case, the sum of the expectations of the no-access periods is calculated for the produced allocation pattern candidate.

Figure 19:
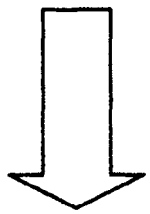
FIG. 19 illustrates a table showing the probability of no access to each slice and each disk node per time slot according to an allocation pattern candidate after data exchange.

FIG. 19 is a table showing the probability of no access to each slice and each disk node per time slot according to an allocation pattern candidate after data exchange. With the data exchange, the respective numbers of accesses to the slices having been exchanged are also exchanged. Thus, the probabilities of no access to those slices are further mutually exchanged.

In consideration of the above-described point, for the allocation pattern candidate after the data exchange, the probability of no access to each disk node per time slot is calculated based on the probability of no access to each slice per time slot. Furthermore, the expectation of the no-access period is calculated for each disk node based on the probability of no access to each disk node per time slot.

In an example of FIG. 19, the expectation of the no-access period for the disk node 100 having the node identifier "SN-A" is "1.18", and the expectation of the no-access period for the disk node 200 having the node identifier "SN-B" is "2.05". Hence, the sum of the respective expectations of the no-access periods for the two disk nodes 100 and 200 is "3.23".

The data exchange in this case is performed regarding only the disk node 100 having the node identifier "SN-A" and the disk node 200 having the node identifier "SN-B". Therefore, the expectations of the no-access periods for the other disk nodes 300 and 400 are not changed. It is thus understood that the sum of the expectations of the no-access periods is increased with the data exchange in this case. In other words, the data exchange increases a possibility of prolonging a time during which the disk node and the storage device can be held in the power saving mode. Hence, the system makes a decision to employ the data exchange (change of assignment of the slices to the segments) in this case.

By repeating similar studies on the data exchange many times, an allocation pattern can be found which even further increases the sum of the expectations of the no-access periods. As a result, it is possible to provide the disk node to which data access is not performed for the certain time, and to reduce the power consumption of the entire system.

Figure 20:
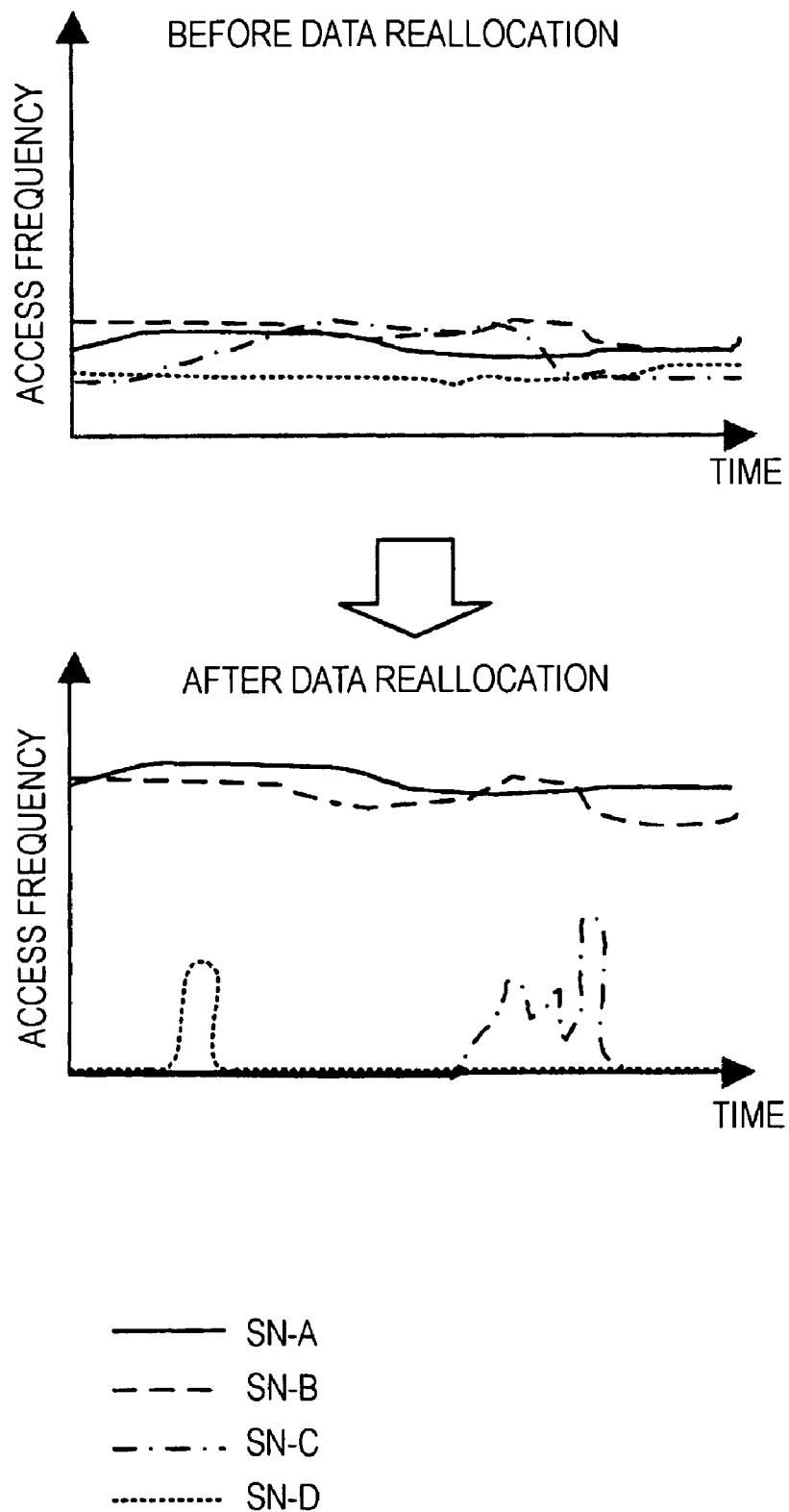
FIG. 20 illustrates the frequency of access to each disk node before and after data reallocation.

FIG. 20 illustrates the frequency of access to each disk node before and after data reallocation. In an example of FIG. 20, before the data reallocation, data access is substantially evenly performed to each disk node. On the other hand, after the data reallocation, data access is more frequently performed to the two disk nodes ("SN-A" and "SN-B"), while data access is seldom performed to the other two disk nodes ("SN-C" and "SC-D") except for some time slots. Therefore, the disk nodes "SN-C" and "SC-D" can be shifted to the power saving mode for time periods during which data access is not performed, and the functions of those disk nodes can be stopped. Consequently, the power consumption of the entire system can be cut.

In addition, in this embodiment, when the disk node is shifted to the power saving mode, the slice managed by the relevant disk node is changed from the primary slice to the secondary slice. This means that, if data access from the access node 600 is a read access, the disk node in the power saving mode at that time is not required to be started up. Stated another way, when data access is requested from the access node 600, the data access is performed, in principle, to the primary slice. Accordingly, if the data access is read access, update of data, for example, in the secondary slice is not generated and hence the disk node managing the secondary slice is not required to be started up.

If the data access is write access, data having been written into the primary slice needs to be written into the secondary slice as well. To that end, if the disk node managing the secondary slice is in the power saving mode, the relevant disk node needs to be started up.

According to this embodiment, as described above, the power consumption of the multi-node storage system can be cut. As seen from FIG. 20, however, access is concentrated on several disk nodes after the data reallocation. Therefore, the data reallocation according to this embodiment is preferably executed under the environment where a total amount of data accesses is not so large. In the case of a system in which the amount of data accesses is increased only for a certain span (e.g., at the end of the month), for example, the data allocation is executed with priority paid to processing efficiency during the span in which the amount of data accesses is greatly increased. On the other hand, during a span in which the amount of data accesses is not so large, the data allocation is executed with priority paid to environmental performance according to the above-described embodiment. As a result, the power consumption can be cut during the span in which processing performance required for the system has an allowance while the processing performance is improved as required.

While in the above-described embodiment the probability of occurrence of the no-access period for each slice is not referred to when the allocation pattern candidate is produced, the allocation pattern candidate can also be produced in consideration of the probability of occurrence of the no-access period for each slice. For example, slices having higher access frequencies (i.e., slices having lower probabilities of occurrence of the no-access periods) are collected in the same disk node. Also, slices having lower access frequencies (i.e., slices having higher probabilities of occurrence of the no-access periods) are collected in the same disk node. By utilizing the probability of occurrence of the no-access period for each slice, which has been already calculated, an allocation pattern candidate having a higher expectation of the no-access period can be produced efficiently.

Furthermore, by collecting data having similarity in access pattern into the same disk node, an allocation pattern candidate having a higher expectation of the no-access period can be produced, by way of example, as follows. The access statistical information contains the number of accesses to each slice per time slot. Slices having common time slots in which the number of accesses is "0" are searched for. If such plural slices are found, a disk node is selected to manage data contained in those slices together. Furthermore, one slice is selected from the plural slices managed by the selected disk node and another one slice is selected from other plural slices similar in access pattern to the former plural slices, thereby providing a pair of two slices. Segments to which the paired slices are assigned are then mutually exchanged. As a result, an allocation pattern candidate can be produced in which the slices similar in access pattern are collected in one disk node.

In addition, by collecting the last access time for each slice in a day, for example, an allocation pattern candidate can be produced in which data in slices having the last access times close to one another can be collected in one disk node.

According to the technique disclosed herein, as described above, data can be allocated to a plurality of disk nodes in such a distributed manner that the expectation of the no-access period is increased, and a time during which the disk node is held in the power saving mode can be prolonged. Consequently, the power consumption of the system can be reduced.

The above-described processing functions can be realized with computers. In such a case, programs are provided which describe processing details of the functions to be executed by the disk nodes 100, 200, 300, and 400 and the control node 500. The above-described processing functions are achieved with the computers by executing the programs in the computers. The programs describing the processing details can be recorded on a computer-readable recording medium. Examples of the computer-readable recording medium include a magnetic recording device, an optical disk, a magneto-optical recording medium, and a semiconductor memory. The magnetic recording device may be for example, a hard disk drive (HDD), a flexible disk (FD), or a magnetic tape. The optical disk may be, for example, a DVD (Digital Versatile Disk), a DVD-RAM, a CD-ROM (Compact Disk-Read Only Memory), or a CD-R (Recordable)/RW (ReWritable) disk. The magneto-optical recording medium may be, for example, an MO (Magneto-Optical) disk.

For distributing the programs, a portable recording medium, such as a DVD or a CD-ROM, recording the programs is, by way of example, entered into a commercial market. As an alternative, the programs may be stored in a server computer such that the programs are transferred from the server computer to another computer via a network.

A computer executing programs loads, into its memory, the programs recorded on the portable recording medium or the programs transferred from the server computer. Then, the computer reads the programs from its memory and executes processing in accordance with the programs. The computer can also directly read the programs from the portable recording medium and can execute processing in accordance with the programs. In addition, when the programs are transferred from the server computer, the computer can execute processing in accordance with the programs each time it receives the individual programs.

It is to be noted that the present invention is not limited to the above-described embodiments and the present invention can be modified in various ways within the scope without departing from the spirit thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer-readable recording medium storing a data allocation control program executed by a computer, the data allocation control program managing data allocation when data is distributively stored in a plurality of disk nodes which are shifted to a power saving mode if no access is performed at a certain time, the program comprising:

an access statistical information collecting step of collecting access statistical information representing the number of accesses performed to respective data managed by the disk nodes within a given time slot, from an access statistical information storage unit which stores the access statistical information;

a no-access probability calculating step of referring to the access statistical information and setting, as a no-access-to-data probability for each data, a value that is increased for data with a smaller number of accesses within the given time slot;

an allocation pattern candidate producing step of producing a plurality of allocation pattern candidates each indicating the disk nodes in which the respective data are to be stored;

an expectation calculating step of calculating, for each of the produced allocation pattern candidates, the no-access-to-data probabilities for the respective data allocated in each of the disk nodes when the respective data are allocated according to the allocation pattern candidate, to thereby calculate a no-access-to-node probability representing a probability that access is not performed to each disk node, and tallying the respective no-access-to-node probabilities for the disk nodes, thus obtaining a no-access period expectation that represents an expected value of occurrence of a no-access period during which access is not performed to some of the disk nodes;

an allocation pattern deciding step of selecting, as an allocation pattern for data reallocation, one of the plurality of produced allocation pattern candidates with the largest one of the calculated no-access period expectation; and a data reallocation instructing step of instructing the disk nodes to reallocate the respective data in accordance with the selected allocation pattern.

2. The computer-readable recording medium according to claim 1, wherein the no-access probability calculating step comprises setting, as the no-access-to-data probability, a value that is a power of two or more with an exponent given by a value resulting from multiplying the number of accesses within the given time slot by a negative number.

3. The computer-readable recording medium according to claim 1, wherein the expectation calculating step comprises calculating the no-access-to-node probability of no access to each disk node by multiplying together the no-access-to-data probabilities for the respective data allocated in each of the disk nodes when the respective data are allocated according to the allocation pattern candidate, and providing a value depending on the calculated no-access-to-node probability as the no-access period expectation for the disk node.

4. The computer-readable recording medium according to claim 1, wherein the access statistical information storage unit stores the access statistical information representing the number of accesses for each of a plurality of time slots obtained by dividing a day into time zones, the access statistical information collecting step comprises collecting the access statistical information representing the number of accesses per time slot, the no-access probability calculating step comprises calculating the no-access-to-data probability for each data per time slot, and the expectation calculating step comprises multiplying together the no-access-to-data probabilities in the same time slot for the respective data allocated in each of the disk nodes when the respective data are allocated according to the allocation pattern candidate, to thereby calculate the no-access-to-node probability per time zone, obtaining, as a per-node expectation representing an expected value of occurrence of a no-access period during which access is not performed to each disk node, a value depending on the sum of the no-access-to-node probabilities for the respective time slots for each disk node, and obtaining the sum of the per-node expectations for the respective disk nodes as the no-access period expectation.

5. The computer-readable recording medium according to claim 1, wherein the allocation pattern candidate producing step comprises repeatedly selecting, from data storage areas prepared respectively in the disk nodes, a pair of storage areas belonging to different ones of the disk nodes, and producing the allocation pattern candidate in which respective data stored in the selected two storage areas are mutually exchanged based on a current allocation pattern, the expectation calculating step comprises calculating the no-access period expectation for the produced allocation pattern candidate whenever the allocation pattern candidate is produced in the allocation pattern candidate producing step, and the allocation pattern deciding step comprises selecting, as the allocation pattern for data reallocation, one of the current allocation pattern and the plurality of produced allocation pattern candidates with the largest one of the calculated no-access period expectations.

6. The computer-readable recording medium according to claim 5, wherein the allocation pattern candidate producing step comprises repeating the selection of each pair of storage areas a certain number of times, thereby producing the plurality of allocation pattern candidates.

7. The computer-readable recording medium according to claim 5, wherein the allocation pattern candidate producing step comprises successively selecting, from the data storage areas prepared respectively in the disk nodes, all selectable pairs of storage areas belonging to different ones of the disk nodes, thereby producing the plurality of allocation pattern candidates.

8. A data allocation control device for managing data allocation when data is distributively stored in a plurality of disk nodes which are shifted to a power saving mode if no access is performed for a certain time, the device comprising:

an access statistical information collecting unit for collecting access statistical information representing the number of accesses performed to respective data managed by the disk nodes within a given time slot, from an access statistical information storage unit which stores the access statistical information;

a no-access probability calculating unit for referring to the access statistical information and setting, as a no-access-to-data probability for each data, a value that is increased for data with a smaller number of accesses within the given time slot;

an allocation pattern candidate producing unit for producing a plurality of allocation pattern candidates each indicating the disk nodes in which the respective data are to be stored;

an expectation calculating unit for calculating, for each of the produced allocation pattern candidates, the no-access-to-data probabilities for the respective data allocated in each of the disk nodes when the respective data are allocated according to the allocation pattern candidate, to thereby calculate a no-access-to-node probability representing a probability that access is not performed to each disk node, and tallying the respective no-access-to-node probabilities for the disk nodes, thus obtaining a no-access period expectation that represents an expected value of occurrence of a no-access period during which access is not performed to some of the disk nodes;

an allocation pattern deciding unit for selecting, as an allocation pattern for data reallocation, one of the plurality of produced allocation pattern candidates with the largest one of the calculated no-access period expectations; and a data reallocation instructing unit for instructing the disk nodes to reallocate the respective data in accordance with the allocation pattern selected by the allocation pattern deciding unit.

9. A data allocation control method for managing data allocation by a computer when data is distributively stored in a plurality of disk nodes which are shifted to a power saving mode if no access is performed for a certain time, the method comprising:

collecting access statistical information representing the number of accesses performed to respective data managed by the disk nodes within a given time slot from an access statistical information storage unit which stores the access statistical information;

referring to the access statistical information and setting, as a no-access-to-data probability for each data, a value that is increased for data with a smaller number of accesses within the given time slot;

producing a plurality of allocation pattern candidates each indicating the disk nodes in which the respective data are to be stored;
calculating, for each of the produced allocation pattern candidates, the no-access-to-data probabilities for the respective data allocated in each of the disk nodes when the respective data are allocated according to the allocation pattern candidate, to thereby calculate a no-access-to-node probability representing a probability that access is not performed to each disk node, and tallying the respective no-access-to-node probabilities for the disk nodes, thus obtaining a no-access period expectation that represents an expected value of occurrence of a no-access period during which access is not performed to some of the disk nodes;
selecting, as an allocation pattern for data reallocation, one of the plurality of produced allocation pattern candidates with the largest one of the calculated no-access period expectations; and
instructing the disk nodes to reallocate the respective data in accordance with the selected allocation pattern.

10. A multi-node storage system for managing data on a network in a distributed manner, the system comprising:
storage devices for storing respective data;
a plurality of disk nodes; and
each of the disk nodes comprising:
an access statistical information storage unit for storing access statistical information representing the number of accesses performed to the data stored in corresponding one of the storage devices within a given time slot;
an access statistical information update unit for updating the access statistical information whenever access is performed to the data stored in the storage device within the given time slot;
a data reallocation unit for, upon receiving an instruction for data reallocation, transferring the data stored in the storage devices in accordance with the instruction; and
an operation mode control unit for, when no access is performed to the data stored in the storage device for a certain time, shifting the disk node to power saving mode in which at least a part of functions of the disk node is stopped,
a control node, the control node comprising:
an access statistical information collecting unit for collecting the access statistical information from the access statistical information storage unit in each of the disk nodes;
a no-access probability calculating unit for referring to the access statistical information and setting, as a no-access-to-data probability for each data, a value that is increased for data with a smaller number of accesses within the given time slot;
an allocation pattern candidate producing unit for producing a plurality of allocation pattern candidates each indicating the disk nodes in which the respective data are to be stored;
an expectation calculating unit for calculating, for each of the produced allocation pattern candidates, the no-access-to-data probabilities for the respective data allocated in each of the disk nodes when the respective data are allocated according to the allocation pattern candidate, to thereby calculate a no-access-to-node probability representing a probability that access is not performed to each disk node, and tallying the respective no-access-to-node probabilities for the disk nodes, thus obtaining a no-access period expectation that represents an expected value of occurrence of a no-access period during which access is not performed to some of the disk nodes;
an allocation pattern deciding unit for selecting, as an allocation pattern for data reallocation, one of the plurality of produced allocation pattern candidates with the largest one of the calculated no-access period expectations; and
a data reallocation instructing unit for instructing the disk nodes to reallocate the respective data in accordance with the allocation pattern selected by the allocation pattern deciding unit.

11. The system according to claim 10, wherein when access to the data stored in the storage device is not performed for a certain time, the operation mode control unit of the disk node stops rotation of a disk in the storage device.

12. The system according to claim 10, wherein when access to the data stored in the storage device is not performed for a certain time, the operation mode control unit of the disk node stops data processing of the disk node.

13. The system according to claim 10, wherein the storage device associated with the disk node stores one of dual-redundant data,
the disk node further comprises a data management information storage unit for storing data management information that manages whether an attribute of the data stored in the storage device is primary indicating data that preferentially becomes an access target, or secondary indicating data that is used when the primary data cannot be accessed, and
when access to the data stored in the storage device is not performed for a certain time, the operation mode control unit of the disk node shifts the disk node to the power saving mode after changing the attribute of the primary data stored in the storage device to secondary.

14. The system according to claim 13, wherein when changing the attribute of the primary data stored in the storage device to secondary, the operation mode control unit of the disk node transmits, to the control node, an attribute change request for requesting change of the attribute of the primary data to secondary, and
the control node manages attributes of respective data managed by the disk node and, in response to the attribute change request from the disk node, changes the attribute of the data designated by the attribute change request from primary to secondary, and changes the attribute of the secondary data corresponding to the data designated by the attribute change request from secondary to primary.

* * * * *